United States Patent
Kusama et al.

(10) Patent No.: US 6,665,451 B1
(45) Date of Patent: Dec. 16, 2003

(54) IMAGE PROCESSING METHOD AND APPARATUS

(75) Inventors: Kiyoshi Kusama, Yokohama (JP); Kentaro Matsumoto, Higashikurume (JP); Kunihiro Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,027

(22) Filed: May 28, 1999

(30) Foreign Application Priority Data

| May 29, 1998 | (JP) | ............... 10-150008 |
| May 29, 1998 | (JP) | ............... 10-150223 |
| May 29, 1998 | (JP) | ............... 10-150226 |
| May 29, 1998 | (JP) | ............... 10-150229 |
| May 29, 1998 | (JP) | ............... 10-150242 |

(51) Int. Cl.$^7$ .................. G06K 9/32; G06K 9/36; H04N 1/387
(52) U.S. Cl. ............... 382/282; 382/284; 382/291; 382/293; 358/450; 358/453
(58) Field of Search .................. 382/282, 284, 382/291, 293, 294, 295, 300, 175, 176, 180, 184, 190, 216, 225, 251, 253, 264, 267, 277; 345/629, 630, 631; 348/584, 588, 598; 358/426.14, 450, 452, 453, 462

(56) References Cited

U.S. PATENT DOCUMENTS

5,963,670 A * 10/1999 Lipson et al. ............... 382/224
6,137,498 A * 10/2000 Silvers ....................... 345/435
6,195,459 B1 * 2/2001 Zhu ............................ 382/176

OTHER PUBLICATIONS

Finkelstein A. et al: "Image Mosaics", Lecture Notes in Computer Science, US, Springer Verlag, New York, NY, No. 1375, Mar. 1998, pp. 11–22.

* cited by examiner

*Primary Examiner*—Jayanti K. Patel
*Assistant Examiner*—Yosef Kassa
(74) *Attorney, Agent, or Firm*—Fitzpatrick, Cella, Harper & Scinto

(57) ABSTRACT

Upon forming a mosaic image by combining a plurality of material images, an original image of the mosaic image is segmented into M×N areas. The image characteristics of these segmented areas are calculated, and a material image corresponding to each segmented area is determined on the basis of the calculated image characteristics while inhibiting a single material image from being repetitively selected for a plurality of areas. By generating the mosaic image in this way, an expected texture pattern due to a specific combination of material images can be prevented from being formed.

41 Claims, 20 Drawing Sheets

FIG. 7

| MATERIAL IMAGE ID | IMAGE FEATURE AMOUNT | USED FLAG |
|---|---|---|
| 0001 | | 0 |
| 0002 | | 0 |
| ⋮ | | ⋮ |

FIG. 8

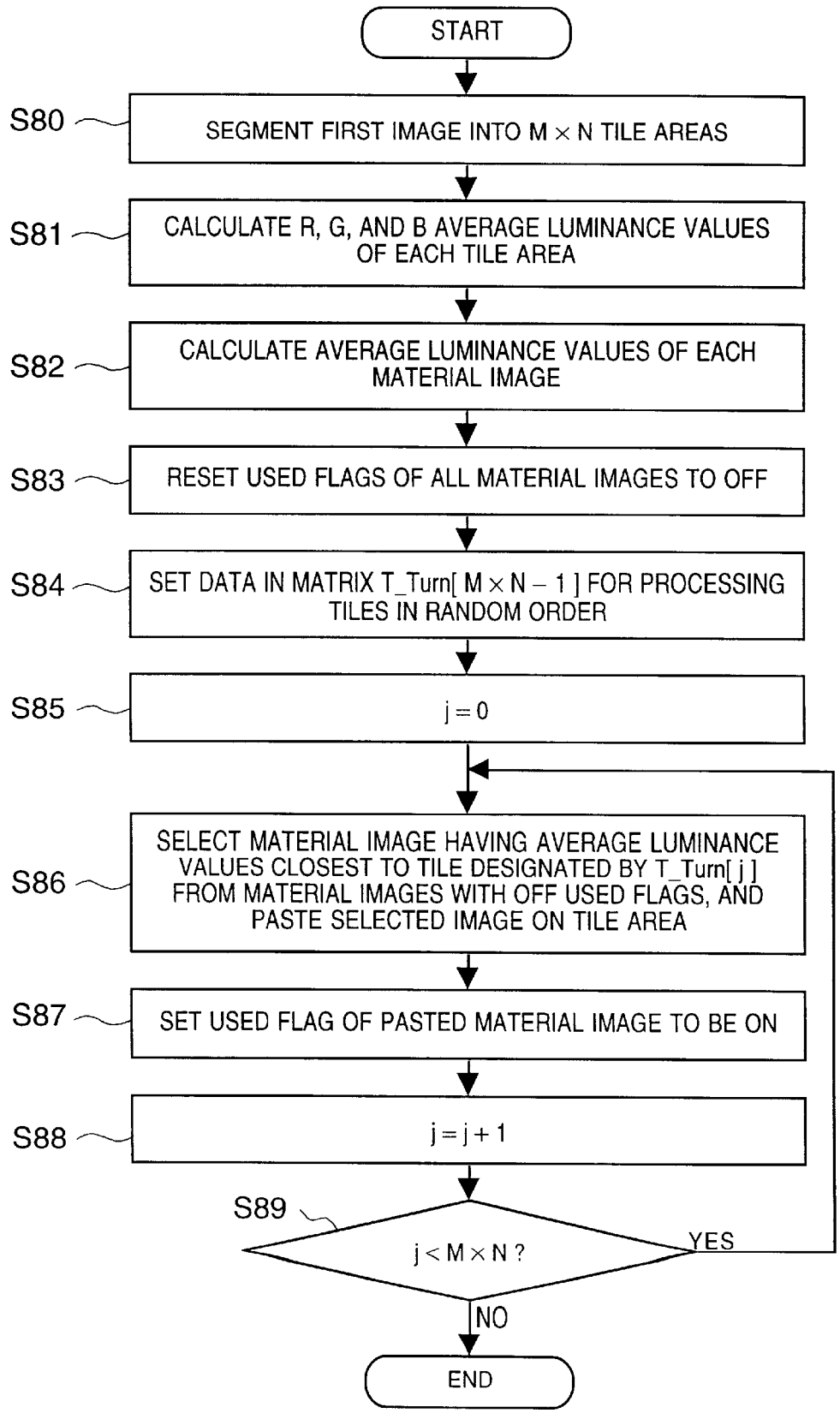

- S80: SEGMENT FIRST IMAGE INTO M × N TILE AREAS
- S81: CALCULATE R, G, AND B AVERAGE LUMINANCE VALUES OF EACH TILE AREA
- S82: CALCULATE AVERAGE LUMINANCE VALUES OF EACH MATERIAL IMAGE
- S83: RESET USED FLAGS OF ALL MATERIAL IMAGES TO OFF
- S84: SET DATA IN MATRIX T_Turn[ M × N − 1 ] FOR PROCESSING TILES IN RANDOM ORDER
- S85: j = 0
- S86: SELECT MATERIAL IMAGE HAVING AVERAGE LUMINANCE VALUES CLOSEST TO TILE DESIGNATED BY T_Turn[ j ] FROM MATERIAL IMAGES WITH OFF USED FLAGS, AND PASTE SELECTED IMAGE ON TILE AREA
- S87: SET USED FLAG OF PASTED MATERIAL IMAGE TO BE ON
- S88: j = j + 1
- S89: j < M × N ?

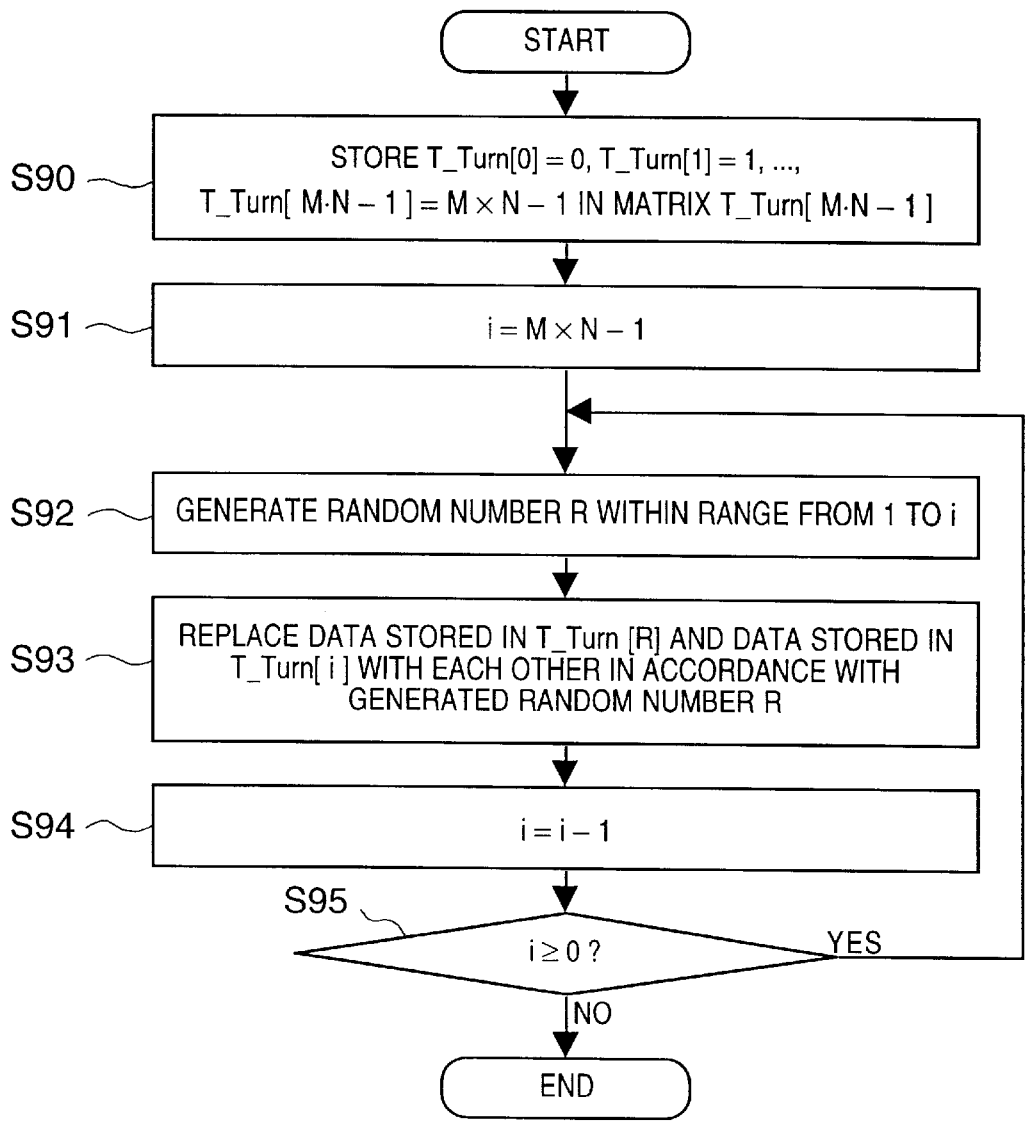

FIG. 11

| MATERIAL IMAGE ID | IMAGE FEATURE AMOUNT | USE COUNT S |
|---|---|---|
| 0001 | | 0 |
| 0002 | | 0 |
| ⋮ | | ⋮ |

F I G. 17
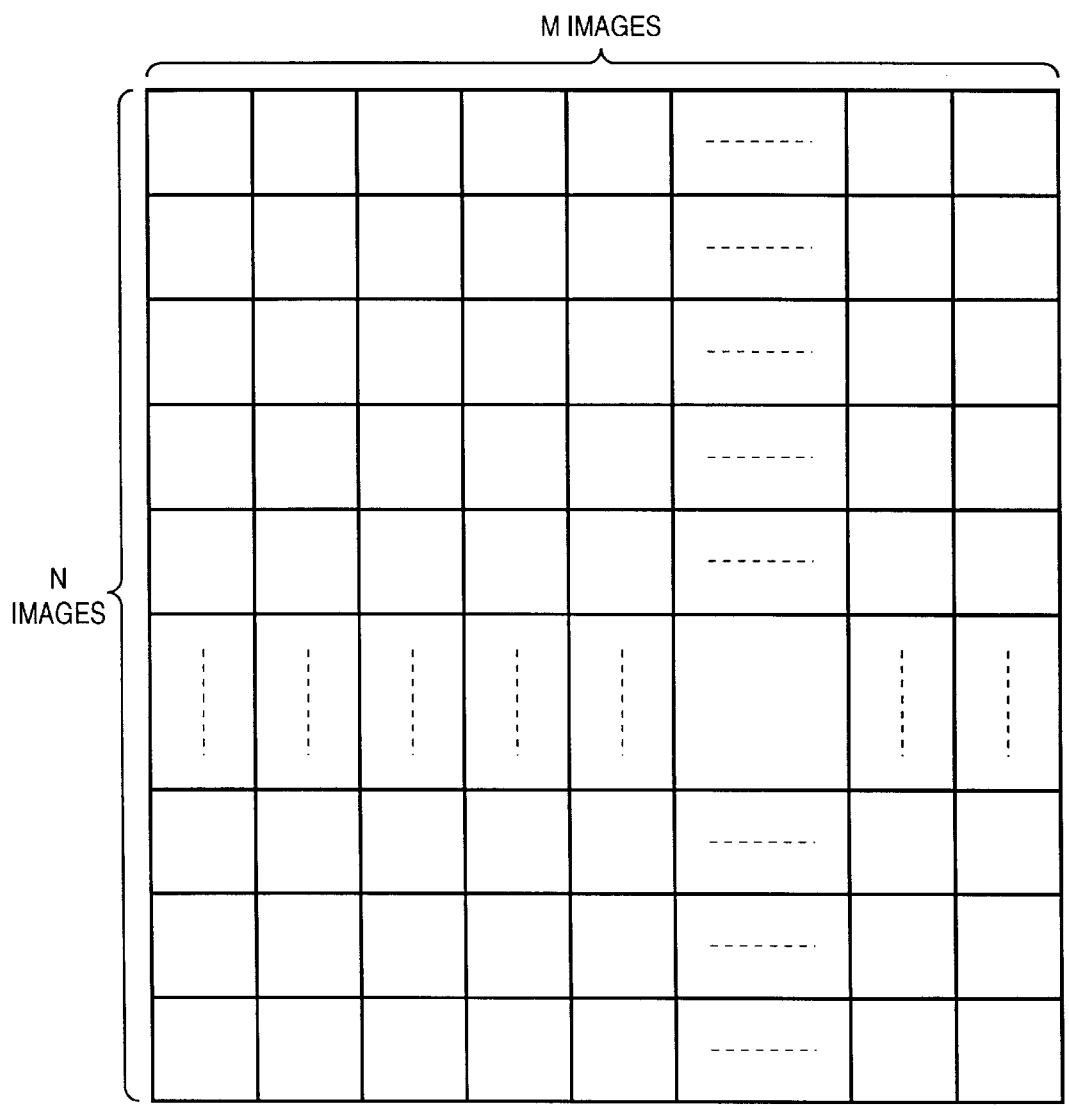

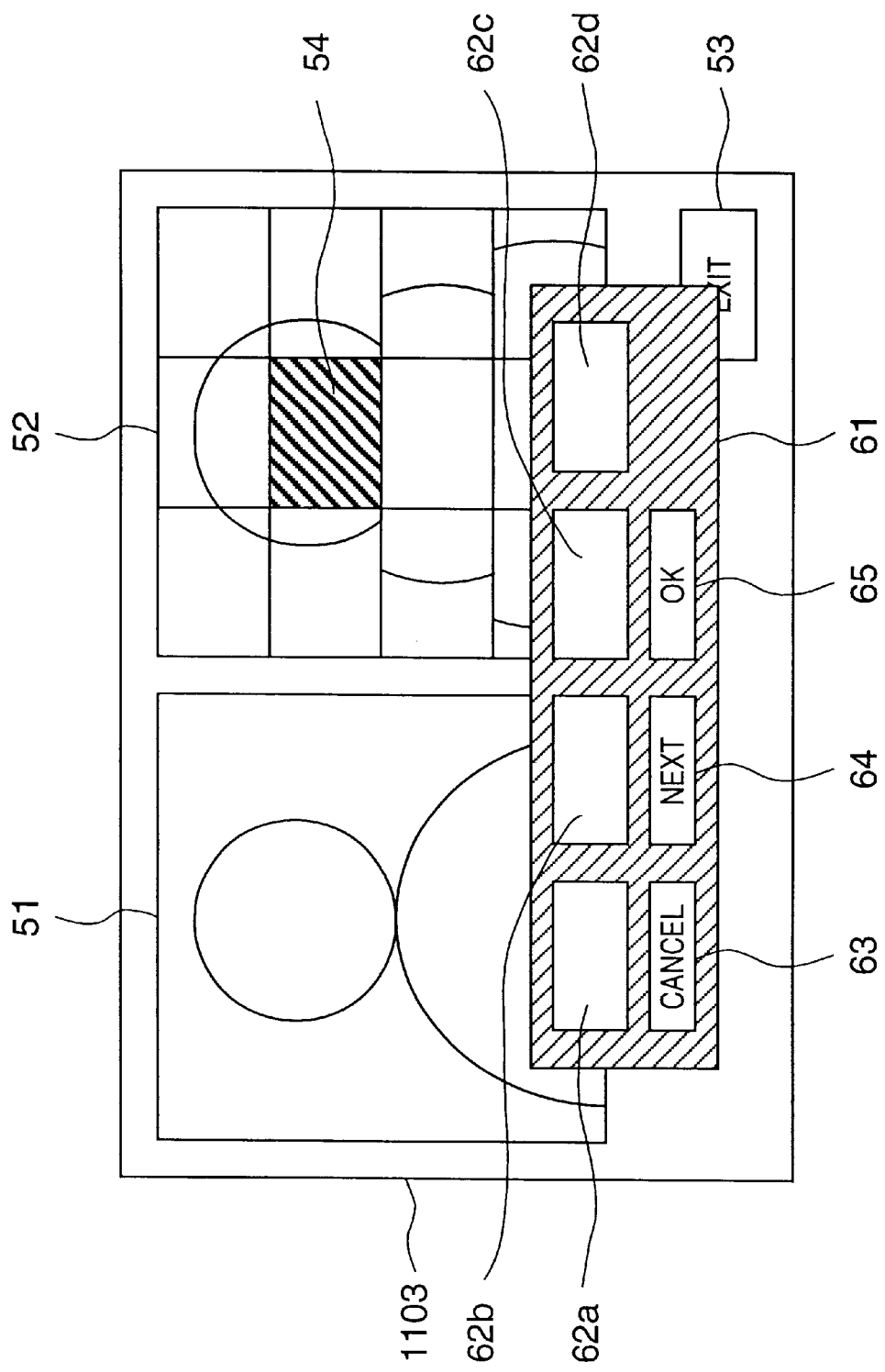

IMAGE PROCESSING METHOD AND APPARATUS

BACKGROUND OF THE INVENTION

The present invention relates to an image processing apparatus and method and, more particularly, to an image processing apparatus and method for generating a mosaic image.

Mosaic is "a design made by inlaying a combination of small pieces of various colors of stone, glass, marble, and the like into a floor, wall, or the like, or a technique of obtaining such design" (Gendai Kokugo Jiten, Sanseido). Using this technique, a design or an image (mosaic image) can be formed by combining a large number of picture images. A mosaic image is generated by image processing as follows. That is, an original design or image is segmented into tiles, and material images most similar to images of those tiles are pasted on those tile areas.

However, the above-mentioned technique has the following problem.

More specifically, since an identical material image may often be pasted on a plurality of segmented tile areas, a concentrated region of identical material images often appears in the generated mosaic image. In such case, the material images generate a texture pattern, and an unexpected pattern may result depending on the original design or image.

SUMMARY OF THE INVENTION

The present invention has been made to solve the above problem, and has as its object to prevent an unexpected texture pattern from being formed upon generating a mosaic image.

It is another object of the present invention to prevent an unexpected texture pattern from being formed and to improve the image quality of a mosaic image by appropriately limiting use of material image upon generating the mosaic image.

It is still another object of the present invention to prevent a texture pattern from being formed in a mosaic image by limiting use of each material image to once upon generating the mosaic image.

It is still another object of the present invention to prevent an unexpected texture pattern from being formed and to improve the image quality of a mosaic image by limiting use of each material image to once and selecting areas to be replaced by material images in a random order upon generating the mosaic image.

It is still another object of the present invention to prevent an unexpected texture pattern from being formed and to improve the image quality of a mosaic image by limiting the number of times of use of each material image to a plurality of number of times, which is determined in advance.

It is still another object of the present invention to prevent an unexpected texture pattern from being formed and to improve the image quality of a mosaic image by limiting the number of times of use of each material image to a plurality of number of times, which is determined in advance, and selecting areas to be replaced by material images in a random order.

It is still another object of the present invention to improve the image quality of a mosaic image by limiting the number of times of use of each material image to a plurality of number of times, which is determined in advance, and inhibiting identical material images from being placed at neighboring positions.

It is still another object of the present invention to generate a mosaic image according to user's favor by allowing the user to replace desired areas of an automatically generated mosaic image by material images of user's choice.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows the format of a material image management table according to the first embodiment;

FIG. 8 is a flow chart showing an example of mosaic image generation according to the second embodiment of the present invention;

FIG. 9 is a flow chart showing an example of a process in the second embodiment, which is done to obtain a random tile processing order;

FIG. 11 shows the format of a material image management table according to the third embodiment;

FIG. 17 is an explanatory view of a mosaic image;

FIGS. 20 and 21 show display examples upon selection of the next candidate of a material image in the eighth embodiment.

DETAILED DESCRIPTION OF THE PREFERRED EMBODIMENTS

Preferred embodiments of the present invention will now be described in detail in accordance with the accompanying drawings.

Mosaic Image Generation Method

Figure 1:
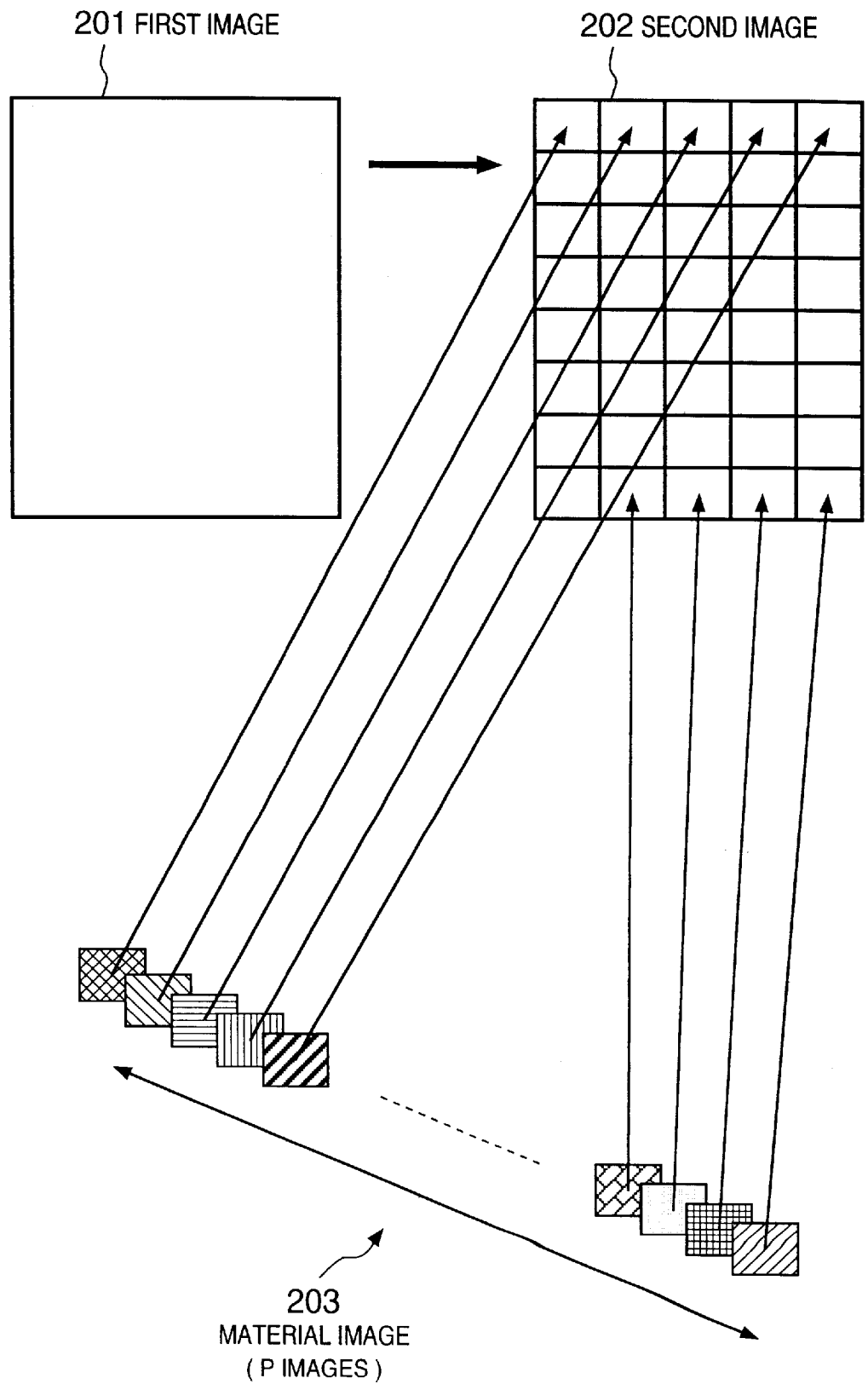
FIG. 1 shows the relationship among a plurality of types of images used in mosaic.

FIG. 1 shows the relationship among a plurality of types of images used in mosaic. Referring to FIG. 1, a first image 201 is an original design or image (e.g., a picture image, computer graphics image, or the like) upon forming an image by mosaic. A second image 202 is an image formed by mosaic. Material images 203 are used for forming the second image 202. The number P of material images 203 is a value large enough to prepare colors and textures required for forming the second image 202.

In FIG. 1, each material image 203 has a size equal to that of a tile for the sake of simplicity. However, the size of the material image 203 need not always be equal to the tile size, and all the material images 203 need not always have equal sizes. When the size of the material image 203 is different from the tile size, the material image 203 to be pasted need only be resized upon pasting that image 203 to the corresponding tile area. Also, the tile shape is not limited to a rectangle but may be an arbitrary shape. Upon pasting the material image 203 on a tile area, the material image 203 need only be cut or deformed to match the tile shape.

A method of forming a mosaic image using material images will be explained below with reference to FIG. 2.

Figure 2:
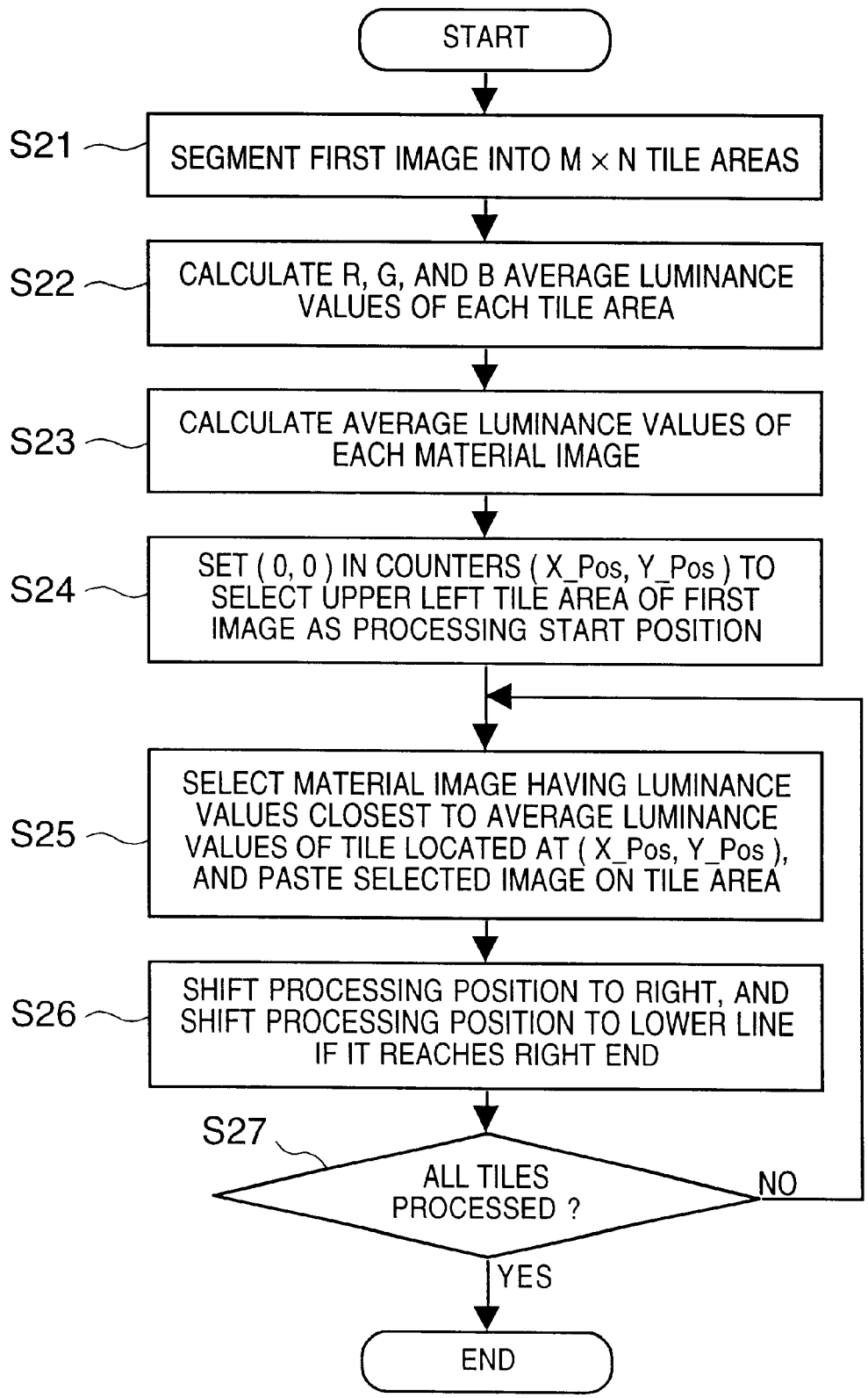
FIG. 2 is a flow chart for explaining a method of forming an image by mosaic.

In step S21 in FIG. 2, the first image 201 is segmented into M×N tiles. As a result, as shown in, e.g., FIG. 3, 4×5 rectangular tiles TL(0, 0), TL(1, 0), TL(2, 0), . . . , TL(2, 4), and TL(3, 4) are generated.

Figure 3:
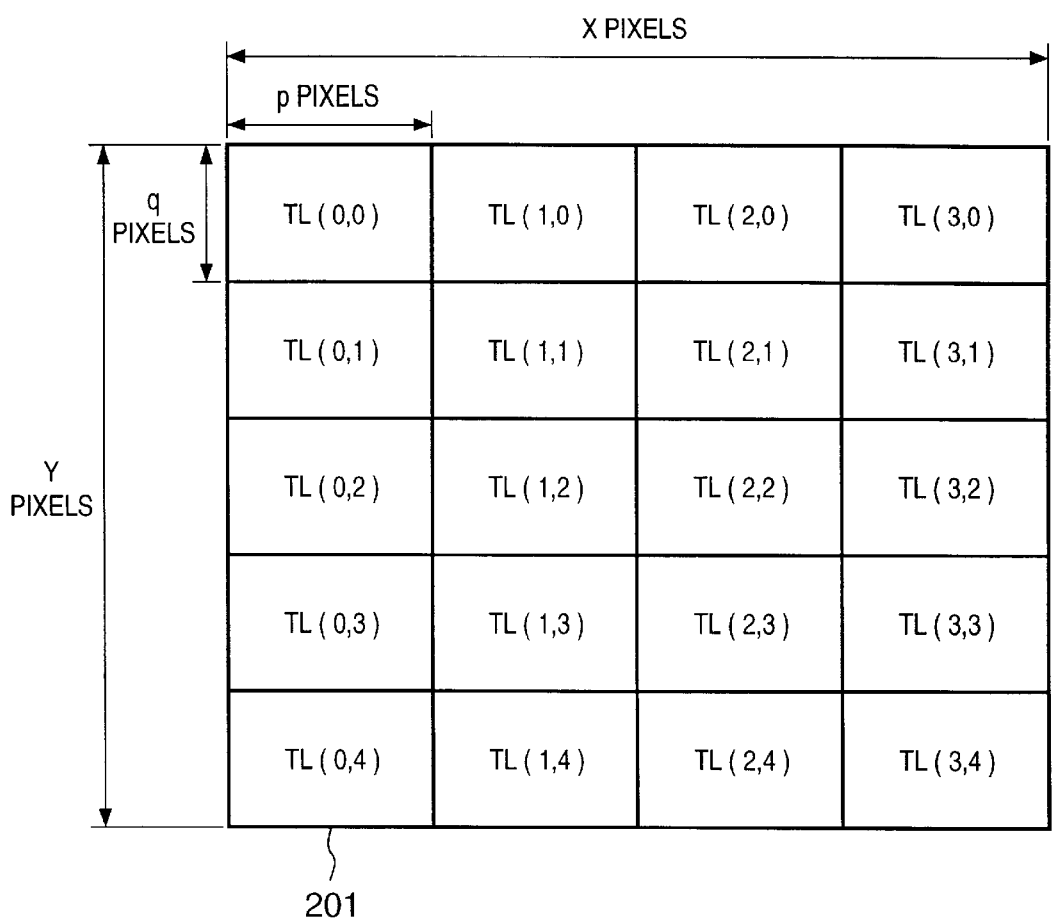
FIG. 3 shows M×N tile areas obtained by segmenting an original image.
Figure 4:
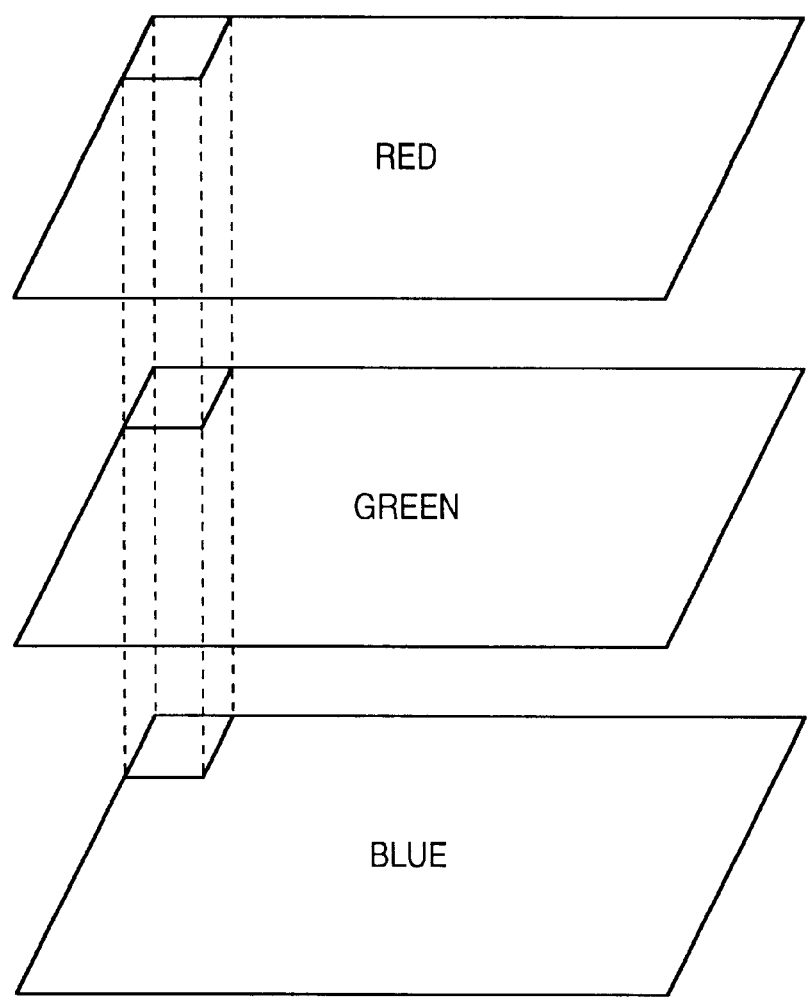
FIG. 4 shows the format of each tile.

Referring to FIG. 3, X and Y respectively represent the numbers of horizontal and vertical pixels of the first image 201, and p and q respectively represent the numbers of horizontal and vertical pixels of each segmented tile. Hence, X=p×M and Y=q×N. FIG. 4 shows the format of each tile. Each tile is decomposed into p×q pixel planes of three primary colors, i.e., red, green, and blue.

Subsequently, in step S22, R, G, and B average luminance values of each of the M×N segmented tiles are calculated by:

$Rd\_av = \Sigma Ri/(p \times q)$ $Gd\_av = \Sigma Gi/(p \times q)$ $Bd\_av = \Sigma Bi/(p \times q)$ In step S23, R, G, and B average luminance values of each of the P material images 203 are calculated by:

$Rs\_av = \Sigma Ri/(p \times q)$ $Gs\_av = \Sigma Gi/(p \times q)$ $Bs\_av = \Sigma Bi/(p \times q)$ In step S24, counters X_Pos ($0 \leq X\_Pos \leq M-1$) and Y_Pos ($0 \leq Y\_Pos \leq N-1$) indicating the position of a tile of interest are reset to zero. Note that (X_Pos, Y_Pos)=(0, 0) indicates the upper left tile position of the first image 201.

In step S25, a material image 203 most suitable for a tile indicated by the counters (X_Pos, Y_Pos) is selected. In this selection method, a distance ΔE given by $\Delta E = (Rs\_av - Rd\_av)^2 + (Gs\_av - Gd\_av)^2 + (Bs\_av - Bd\_av)^2$ where a^2 is the square of a is calculated based on R, G, and B tristimulus values between the average luminance values of each tile and those of each material image 203, and a material image 203 with the smallest ΔE is selected. Upon pasting the selected material image 203 on a tile area, if its size does not match that of the tile area, the material image 203 is enlarged/reduced to have an appropriate size.

In step S26, the counters (X_Pos, Y_Pos) are counted up or down sequentially in the horizontal and vertical directions, and steps S25 to S27 repeat themselves until it is determined in step S27 that the process in step S25 is done for all tiles.

Hence, when a mosaic image is generated by the aforementioned processing, if M×N segmented tiles include those which have the same or nearby average luminance values, an identical material image 203 is selected and is pasted on these tile areas. For this reason, in a concentrated region of identical material images 203 in the generated mosaic image 202, those material images 203 form an unexpected pattern, and an unexpected pattern is generated in the mosaic image 202.

Mosaic Image Forming Method in First Embodiment

Figure 5:
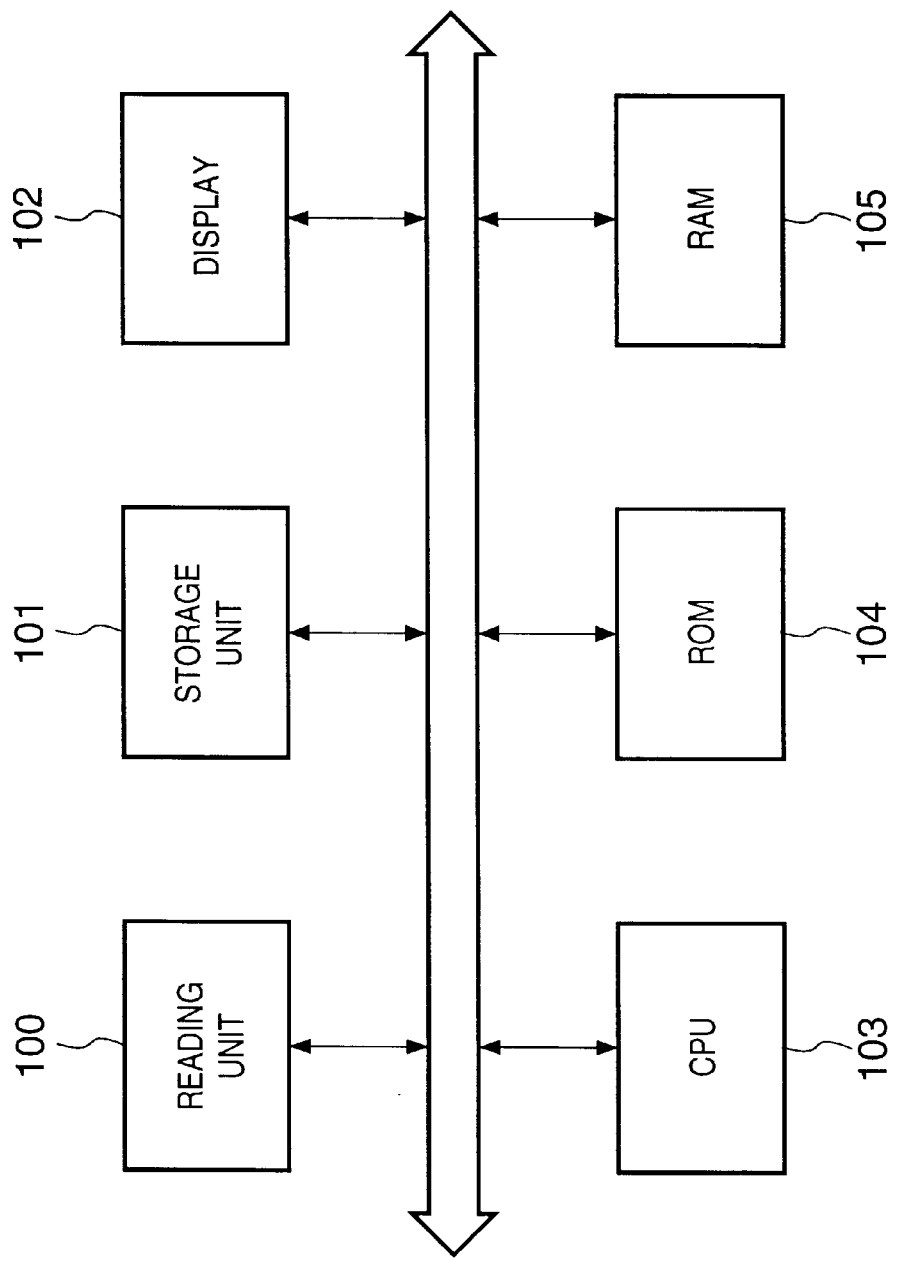
FIG. 5 is a block diagram showing the arrangement of an image processing apparatus for generating a mosaic image.

FIG. 5 is a block diagram showing an example of the arrangement of an image processing apparatus for generating a mosaic image according to an embodiment of the present invention.

Referring to FIG. 5, a reading unit 100 is, e.g., a scanner for reading an image. A storage unit 101 stores and manages images in a storage medium such as a hard disk or the like, and constructs, e.g., an image database. A display 102 is a monitor such as a CRT, LCD, or the like for displaying images stored in the storage unit 101 or an image read by the reading unit 100.

A CPU 103 controls the overall image processing apparatus in accordance with a program pre-stored in a ROM 104, and takes part in all the aforementioned processes. A RAM 105 is used as a work memory of the CPU 103.

Note that the image processing apparatus of this embodiment has various other building elements in addition to the above-mentioned units. However, since the arrangement of these elements is not the principal part of the present invention, a detailed description thereof will be omitted.

Mosaic image generation in the image processing apparatus of this embodiment will be described below with reference to the flow chart in FIG. 6.

Figure 6:
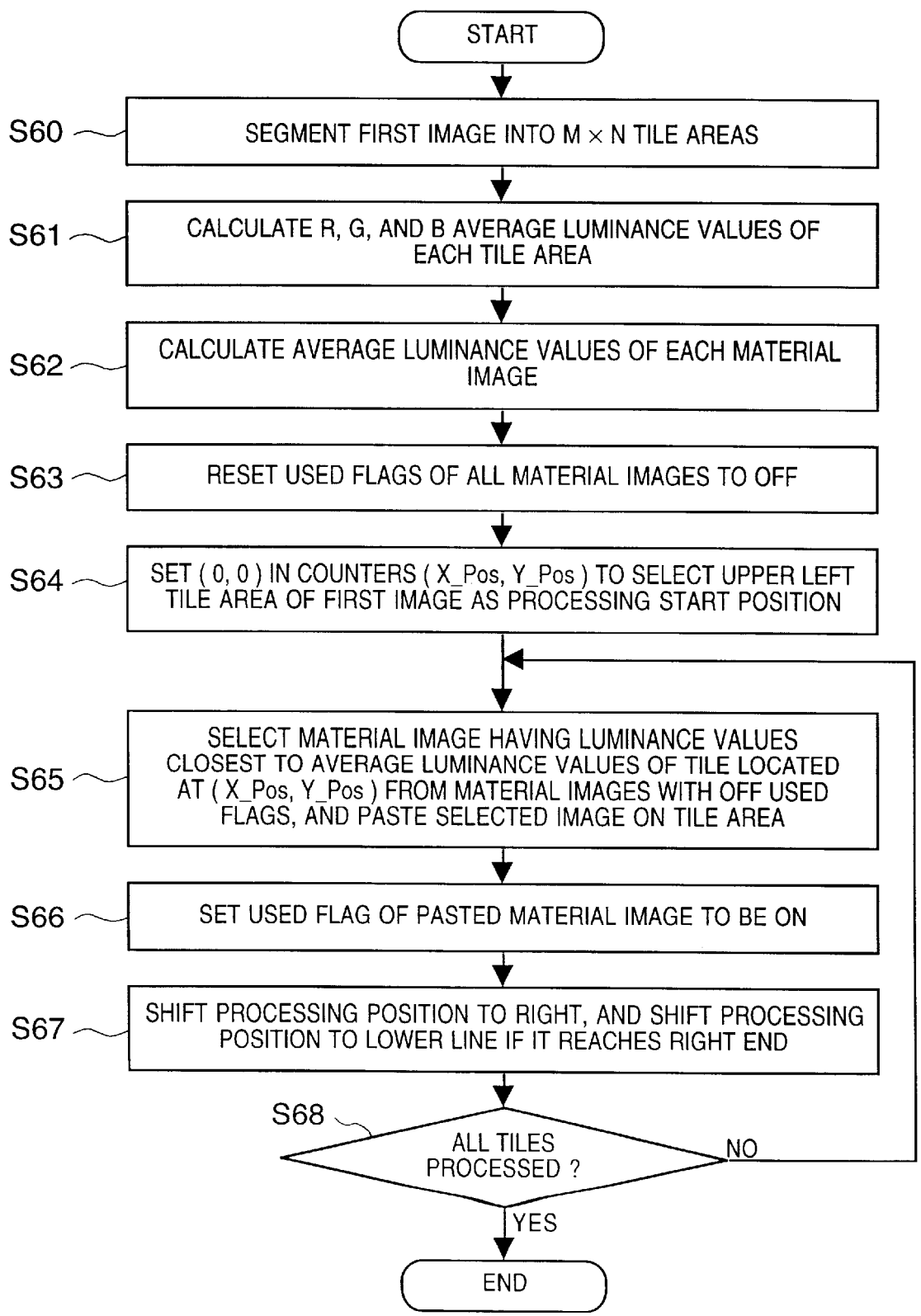
FIG. 6 is a flow chart showing an example of mosaic image generation according to the first embodiment of the present invention.

In step S60 in FIG. 6, the first image 201 is segmented into M×N tiles. As a result, as shown in, e.g., FIG. 3, 4×5 rectangular tiles TL(0, 0), TL(1, 0), TL(2, 0), . . . , TL(2, 4), and TL(3, 4) are generated.

Subsequently, in step S61, R, G, and B average luminance values of each of the M×N segmented tiles are calculated by:

$Rd\_av = \Sigma Ri/(p \times q)$ $Gd\_av = \Sigma Gi/(p \times q)$ $Bd\_av = \Sigma Bi/(p \times q)$ In step S62, R, G, and B average luminance values of each of the P material images 203 are calculated by:

$Rs\_av = \Sigma Ri/(p \times q)$ $$Gs\_av = \Sigma Gi/(p \times q)$$

$$Bs\_av = \Sigma Bi/(p \times q)$$

Note that the image characteristics such as R, G, and B average luminance values of the material images 203 may be obtained in advance. In this case, the image characteristics may be recorded as header information of each material image 203, or may be recorded in a table which is stored in the storage unit 101 and corresponds to the material image 203.

FIG. 7 shows an example of the data format of a material image management table according to the first embodiment. In this embodiment, the material image management table shown in FIG. 7 stores feature amounts (average luminance values) calculated in step S62. More specifically, a pair of a material image ID that specifies each material image, and feature amounts of the material image corresponding to that material image ID are registered. When such material image management table is stored in the storage unit 101, the feature amount calculations of the material images need not be repeated.

In step 63, used flags of all the P material images 203 are reset to OFF. Note that the "used flag" indicates whether or not the corresponding material image 203 is pasted on the first image 201. At the time of step S63, since none of material images 203 have been selected and pasted, the used flags of all the P material images 203 are reset to OFF.

Note that the used flags are held in the material image management table in units of material images, as shown in FIG. 7.

In step S64, counters X_Pos ($0 \leq $ X_Pos $\leq $ M-1) and Y_Pos ($0 \leq $ Y_Pos $\leq $ N-1) indicating the position of a tile of interest are reset to zero, so as to start processing from the upper left tile position of the first image 201 corresponding to (X_Pos, Y_Pos)=(0, 0).

In step S65, a material image 203 most suitable for a tile indicated by the counters (X_Pos, Y_Pos) is selected from those with OFF used flags. In this selection method, a distance $\Delta E$ given by $$\Delta E = (Rs\_av - Rd\_av)^2 + (Gs\_av - Gd\_av)^2 + (Bs\_av - Bd\_av)^2$$

is calculated based on R, G, and B tristimulus values between the average luminance values of each tile and those of each material image 203, and a material image 203 with the smallest $\Delta E$ is selected. Upon pasting the selected material image 203 on a tile area, if its size or shape does not match that of the tile area, the material image 203 is enlarged/reduced to have an appropriate size or shape.

In step S66, a used flag in the material image management table shown in FIG. 7 corresponding to the material image 203 which is selected and pasted on the first image 201 is set to be ON, so as to inhibit the selected material image 203 from being pasted on another tile area.

In step S67, the counters (X_Pos, Y_Pos) are counted up or down sequentially in the horizontal and vertical directions, and steps S65 to S67 repeat themselves until it is determined in step S68 that the process in step S65 is done for all tiles.

As described above, according to the first embodiment, since a material image selected once is not used again in a single mosaic image, an unexpected texture pattern can be prevented from being formed by identical material images.

Second Embodiment

In the first embodiment, an unexpected texture pattern is prevented from being formed using a method of inhibiting a material image 203 which has been pasted on a given tile area from being pasted on another tile area. However, since material images 203 are pasted in the order from the upper left tile to the lower right tile without using identical material images 203, a material image 203, the average luminance values of which are relatively close to those of a tile image, can be selected from many material images 203 in the upper left region on the first image 201, but the number of material images 203 that can be used decreases on the lower right region of the first image 201, and it often becomes harder to select a material image 203 having average luminance values close to those of a tile image. Therefore, a mosaic image generated in this way suffers certain image quality discrepancy between its upper left region and lower right region.

The second embodiment solves this problem. Note that the arrangement of an image processing apparatus in the second embodiment is the same as that in the first embodiment, and a detailed description thereof will be omitted.

Mosaic image generation in the image processing apparatus of the second embodiment will be described below with reference to the flow chart in FIG. 8.

In step S80 in FIG. 8, the first image 201 is segmented into M×N tiles. As a result, as shown in, e.g., FIG. 3, 4×5 rectangular tiles TL(0, 0), TL(1, 0), TL(2, 0), ..., TL(2, 4), and TL(3, 4) are generated.

Subsequently, in step S81, R, G, and B average luminance values of each of the M×N segmented tiles are calculated by:

$$Rd\_av = \Sigma Ri/(p \times q)$$

$$Gd\_av = \Sigma Gi/(p \times q)$$

$$Bd\_av = \Sigma Bi/(p \times q)$$

In step S82, R, G, and B average luminance values of each of the P material images 203 are calculated by:

$$Rs\_av = \Sigma Ri/(p \times q)$$

$$Gs\_av = \Sigma Gi/(p \times q)$$

$$Bs\_av = \Sigma Bi/(p \times q)$$

Note that the image characteristics such as R, G, and B average luminance values of the material images 203 may be obtained in advance. In this case, the image characteristics may be recorded as header information of each material image 203, or may be recorded in a table which is stored in the storage unit 101 and corresponds to the material image 203.

In step S83, used flags of all the P material images 203 are reset to OFF. Note that the "used flag" indicates whether or not the corresponding material image 203 is pasted on the first image 201. At the time of step S83, since none of material images 203 have been selected and pasted, the used flags of all the P material images 203 are reset to OFF.

Note that the image characteristics (average luminance values in this embodiment) obtained in step S82 and used flags are stored in a table shown in FIG. 7, as in the first embodiment.

In step S84, data indicating a random processing order of tiles are stored in a matrix T_Turn[M*N-1]. Note that the matrix stores data so that the quotient K/(M-1) indicates a Y-coordinate and the remainder indicates an X-coordinate when T_Turn[ ]=K. The method of storing the random processing order of tiles in that matrix will be explained below with reference to the flow chart in FIG. 9.

Referring to FIG. 9, T_Turn[0]=0, T_Turn[1]=1, T_Turn[2]=2, . . . , T_Turn[M*N−1]=M*N−1 are temporarily stored in the matrix in step S90. M*N−1 is set in counter i in step S91, and a random number R ranging from 1 to i is generated in step S92.

In step S93, data stored in T_Turn[R] and T_Turn[i] are replaced with each other in accordance with the generated random number R. In step S94, counter i is decremented (i=i−1). If it is determined in step S95 that i≧0, the flow returns to step S92; otherwise, data replacement ends.

In this way, data for processing tiles in the random order are stored in the matrix T_Turn[M*N−1].

In step S85 in FIG. 8, counter j is reset to zero. In step S86, a material image 203 having average luminance values closest to those of a tile image designated by T_Turn[j] is selected. The material images 203 as selection candidates are only those with OFF used flags in the material image management table shown in FIG. 7. For example, when T_Turn[j]=0, the tile position is (0, 0), i.e., the upper left tile. In this selection method, a distance ΔE given by $$\Delta E = (Rs\_av - Rd\_av)^2 + (Gs\_av - Gd\_av)^2 + (Bs\_av - Bd\_av)^2$$

is calculated based on R, G, and B tristimulus values between the average luminance values of each tile and those of each material image 203, and a material image 203 with the smallest ΔE is selected. Upon pasting the selected material image 203 on a tile area, if its size or shape does not match that of the tile area, the material image 203 is enlarged/reduced to have an appropriate size or shape.

In step S87, a used flag in the material image management table shown in FIG. 7 corresponding to the material image 203 which is selected and pasted on the first image 201 is set to be ON, so as to inhibit the selected material image 203 from being pasted on another tile area. Counter j is incremented in step S88, and the processes in steps S86 to S88 repeat themselves while it is determined in step S89 that j<M×N, thereby pasting material images 203 on all the tiles.

As described above, according to the second embodiment, since a material image selected once is not used again in a single mosaic image and tiles are selected in a random order to paste appropriate material images thereon, an unexpected texture pattern can be prevented from being formed, and the entire mosaic image can have uniform image quality, thus generating a mosaic image with higher image quality.

Third Embodiment

In the first and second embodiments, a material image 203 which has been pasted on a given tile area is never pasted on another tile area. With this method, an unexpected texture pattern is prevented from being formed. Such method is effective if the number (of types) of material images is sufficiently large. However, when the number (of types) of material images is small, material images to be pasted on tile areas become short, and a material image 203 having image characteristics considerably different from those of a tile may be pasted on that tile area. For this reason, the image quality of a mosaic image generated considerably deteriorates.

In the third embodiment, a mosaic image formation method that can solve the aforementioned problem will be explained.

Note that the arrangement of an image processing apparatus according to the third embodiment is the same as that in the first embodiment, and a detailed description thereof will be omitted.

Mosaic image generation in the image processing apparatus of the third embodiment will be described below with reference to the flow chart in FIG. 10.

Figure 10:
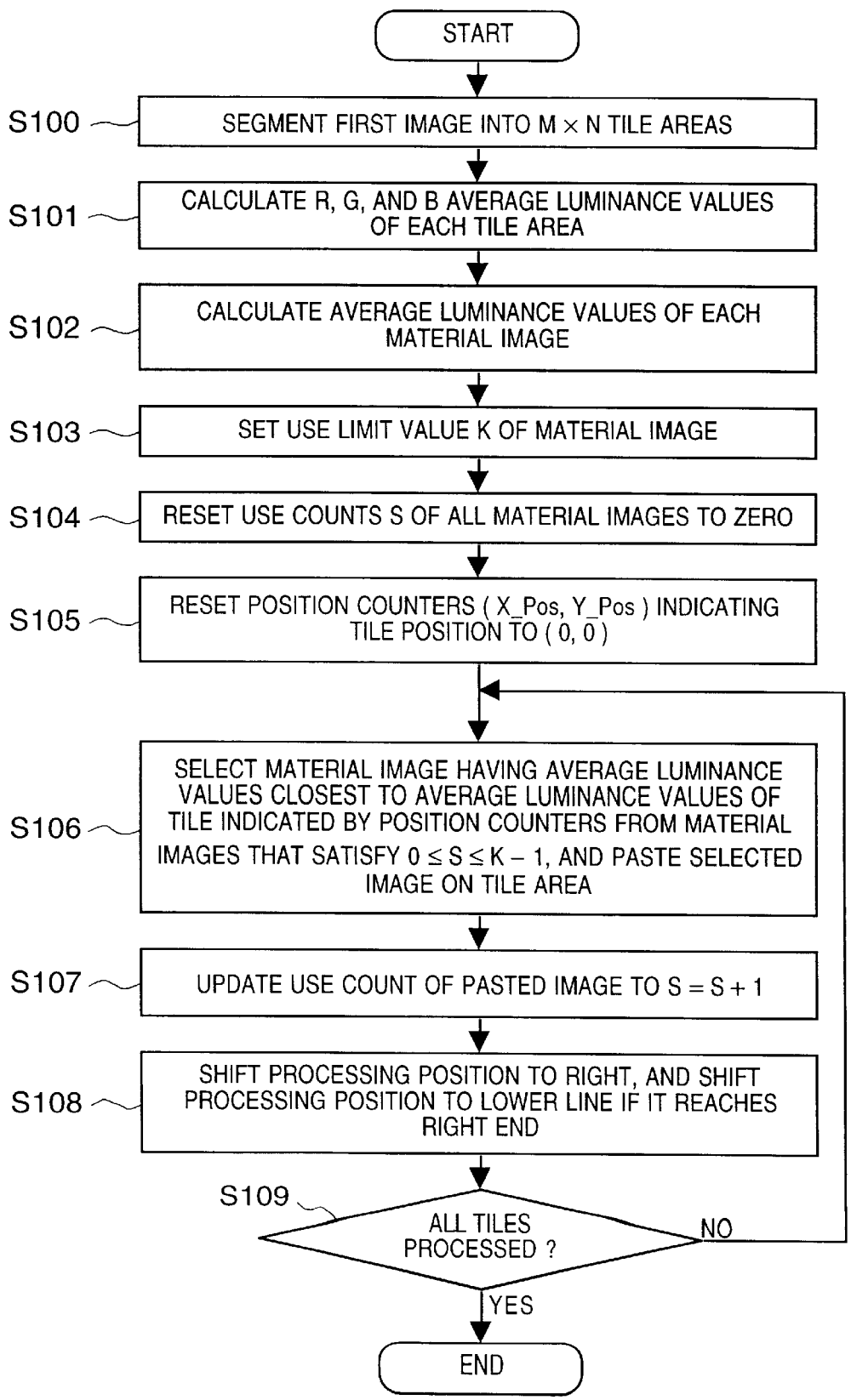
FIG. 10 is a flow chart showing an example of mosaic image generation according to the third embodiment of the present invention.

In step S100 in FIG. 10, the first image 201 is segmented into M×N tiles. As a result, as shown in, e.g., FIG. 3, 4×5 rectangular tiles TL(0, 0), TL(1, 0), TL(2, 0), . . . , TL(2, 4), and TL(3, 4) are generated.

Subsequently, in step S101, R, G, and B average luminance values of each of the M×N segmented tiles are calculated by:

$$Rd\_av = \Sigma Ri/(p \times q)$$

$$Gd\_av = \Sigma Gi/(p \times q)$$

$$Bd\_av = \Sigma Bi/(p \times q)$$

In step S102, R, G, and B average luminance values of each of the P material images 203 are calculated by:

$$Rs\_av = \Sigma Ri/(p \times q)$$

$$Gs\_av = \Sigma Gi/(p \times q)$$

$$Bs\_av = \Sigma Bi/(p \times q)$$

Note that the image characteristics such as R, G, and B average luminance values of the material images 203 may be obtained in advance. In this case, the image characteristics may be recorded as header information of each material image 203, or may be recorded in a table which is stored in the storage unit 101 and corresponds to the material image 203.

FIG. 11 shows an example of the data format of a material image management table according to the third embodiment. In this embodiment, the material image management table shown in FIG. 11 stores feature amounts (average luminance values) calculated in step S102. More specifically, a pair of a material image ID that specifies each material image, and feature amounts of the material image corresponding to that material image ID are registered. When such material image management table is stored in the storage unit 101, the feature amount calculations of the material images need not be repeated.

A use limit value K of each material image 203 is set in step S103, and use counts S all material images 203 are reset to zero in step S104. The use limit value K must be set at an appropriate value on the basis of the relationship between the number (of types) of material images 203 and the number of (M×N) of tiles. The use count S indicates the number of times each material image 203 is pasted on the first image 201. At the time of step S104, since none of material images 203 have been selected and pasted, the use counts of all the material images 203 are zero.

In this embodiment, a field for registering the use count S of each material image is assured in the material image management table, as shown in FIG. 11.

In step S105, counters (X_Pos, Y_Pos) that instruct the position of a tile of interest are reset to (0, 0) to designate the upper left tile of the first image 201. In step S106, a material image 203 having average luminance values closest to those of a tile designated by the position counters (X_Pos, Y_Pos) is selected from those having use counts S which satisfy 0≦S≦K−1, and is pasted on that tile area. In this selection method, a distance ΔE given by $$\Delta E = (Rs\_av - Rd\_av)^2 + (Gs\_av - Gd\_av)^2 + (Bs\_av - Bd\_av)^2$$

is calculated based on R, G, and B tristimulus values between the average luminance values of each tile and those of each material image 203, and a material image 203 with the smallest ΔE is selected. Upon pasting the selected material image 203 on a tile area, if its size or shape does not match that of the tile area, the material image 203 is enlarged/reduced to have an appropriate size or shape.

The use count S of the pasted material image 203 is incremented in step S107, and the counters (X_Pos, Y_Pos) are counted up or down sequentially in the horizontal and vertical directions in step S108. Steps S106 to S108 repeat themselves until it is determined in step S109 that the process in step S106 is done for all tiles.

As described above, according to the third embodiment, by appropriately setting the use limit value K of each material image 203, even when the number (of types) of material images 203 is small, the material images can be prevented from becoming short, and the image quality of a mosaic image generated can be prevented from deteriorating.

Note that the use limit value K may be determined as follows. For example, after a mosaic image is generated by setting K at a given default value, mosaic images are generated by increasing/decreasing the default value, and K is finally set by checking the image qualities and the degrees of texture formation on those mosaic images.

Fourth Embodiment

Mosaic image generation according to the fourth embodiment of the present invention will be explained below. In the fourth embodiment, the random processing in the second embodiment is applied to the third embodiment. Note that a detailed description of the same arrangement and processes as those in the third embodiment will be omitted.

Figure 12:
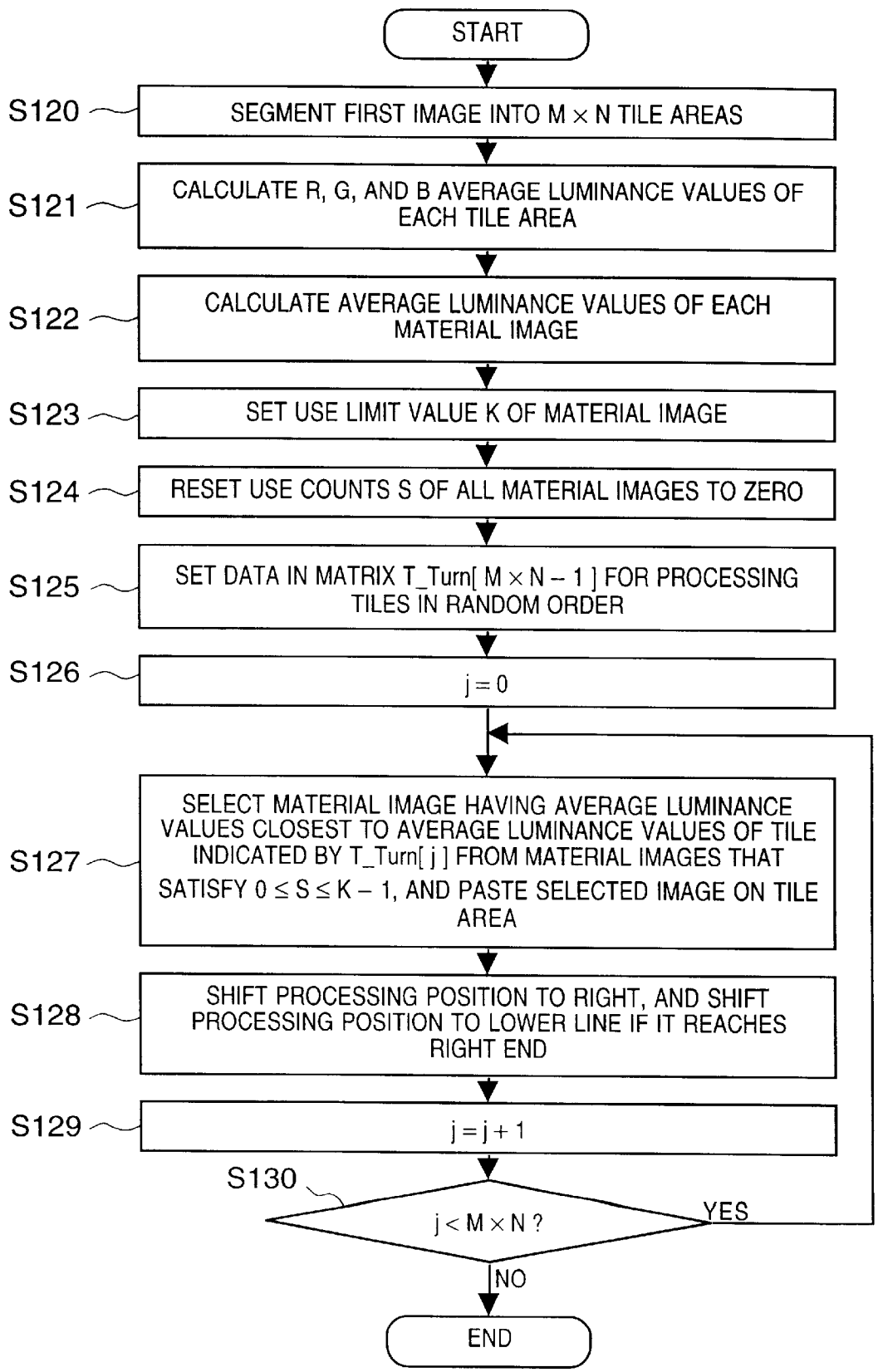
FIG. 12 is a flow chart showing an example of mosaic image generation according to the fourth embodiment of the present invention.

FIG. 12 is a flow chart showing an example of mosaic image generation according to the fourth embodiment. In FIG. 12, steps S120 to S124 are the same as those in steps S100 to S104 shown in FIG. 10, and a detailed description thereof will be omitted.

In step S125, data indicating a random processing order of tiles are stored in a matrix T_Turn[M*N−1]. Note that the matrix stores data so that the quotient K/(M−1) indicates a Y-coordinate and the remainder indicates an X-coordinate when T_Turn[ ]=K. The method of storing the random processing order of tiles in that matrix is as has been described earlier with reference to the flow chart in FIG. 9.

In step S126 in FIG. 12, counter j is reset to zero. In step S127, a material image 203 having average luminance values closest to those of a tile image designated by T_Turn [j] is selected from the material images with use counts S which satisfy $0 \leq S \leq K-1$. For example, when T_Turn[j]=0, the tile position is (0, 0), i.e., the upper left tile. In this selection method, a distance ΔE given by $$\Delta E = (Rs\_av - Rd\_av)^2 + (Gs\_av - Gd\_av)^2 + (Bs\_av - Bd\_av)^2$$

is calculated based on R, G, and B tristimulus values between the average luminance values of each tile and those of each material image 203, and a material image 203 with the smallest ΔE is selected. Upon pasting the selected material image 203 on a tile area, if its size or shape does not match that of the tile area, the material image 203 is enlarged/reduced to have an appropriate size or shape.

The use count S of the pasted material image 203 in the material image management table (FIG. 11) is incremented in step S128, and counter j is incremented in step S129. The processes in steps S127 to S129 repeat themselves while it is determined in step S130 that j<M×N, thereby pasting material images 203 on all the tiles.

As described above, according to the fourth embodiment, since the number of times of use of an identical material image in a single mosaic image is limited to K and tiles are selected in a random order to paste appropriate material images thereon, an unexpected texture pattern can be prevented from being formed, and material images 203 can be prevented from becoming short even when the number (of types) of material images 203 is small. Hence, the entire mosaic image can have uniform image quality, and a mosaic image with higher image quality can be generated.

When the use count S is reflected in evaluation of ΔE in the third and fourth embodiments, use of material images 203 with larger use counts S may be limited, and formation of an unexpected texture pattern can be minimized. In this case, for example, the evaluation formula of ΔE is rewritten as:

$$\Delta E = \{(Rs\_av - Rd\_av)^2 + (Gs\_av - Gd\_av)^2 + (Bs\_av - Bd\_av)^2\}(S+1)$$

Fifth Embodiment

In the third and fourth embodiments, the image quality of a mosaic image is improved by limiting the number of times of use of each material image. However, identical material images may be placed at neighboring positions in a mosaic image even under such limitation. Upon displaying an image which includes identical material images placed at neighboring positions, the portion of the identical material images is emphasized, resulting in low image quality of the mosaic image.

The fifth embodiment solves the aforementioned problem. Note that the arrangement of an image processing apparatus according to the fifth embodiment is the same as that in the first embodiment, and a detailed description thereof will be omitted.

Figure 13:
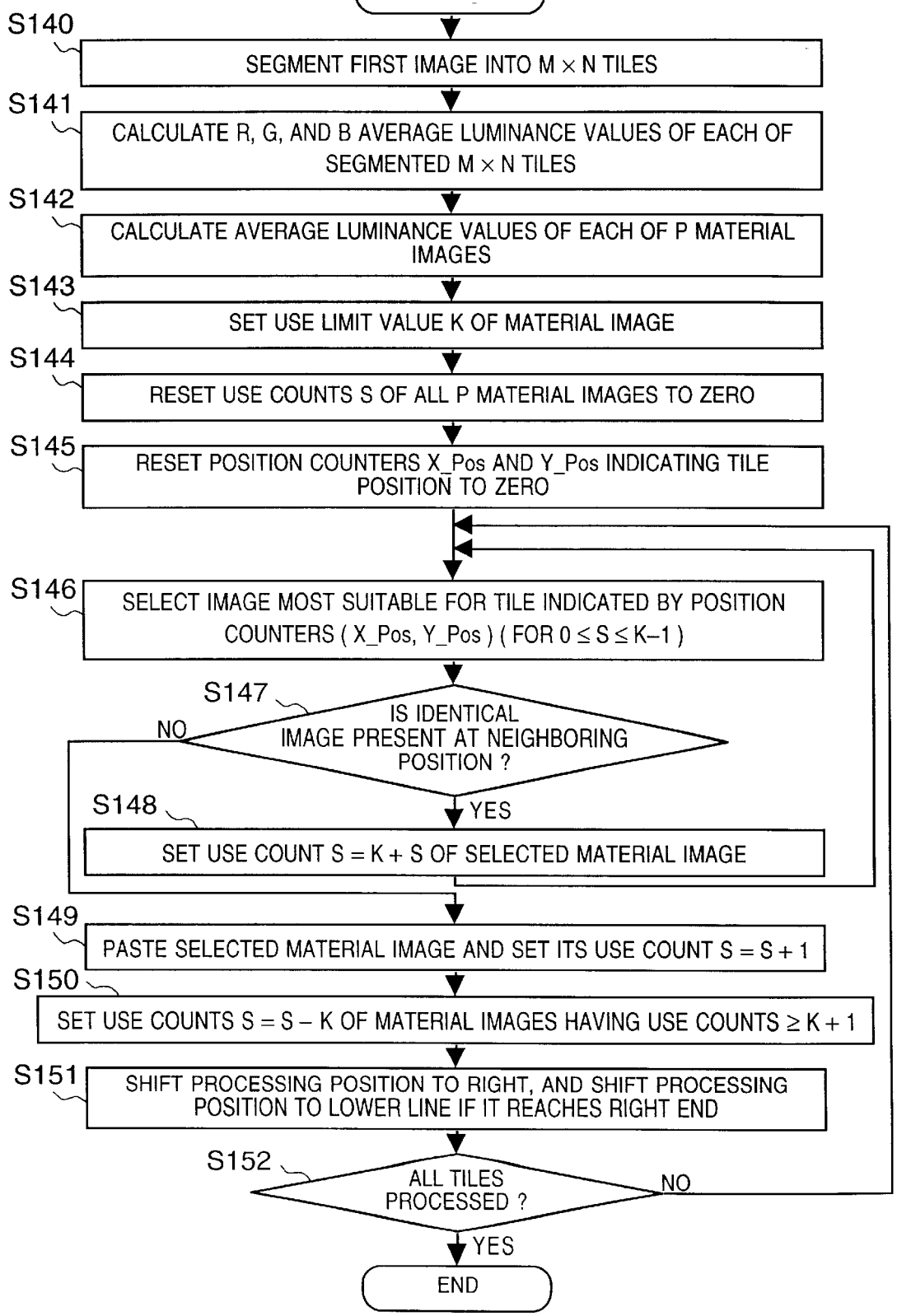
FIG. 13 is a flow chart showing an example of mosaic image generation according to the fifth embodiment of the present invention.

Mosaic image generation according to the fifth embodiment will be explained below with reference to the flow chart in FIG. 13. FIG. 13 is a flow chart showing the mosaic image generation method according to the fifth embodiment.

Referring to FIG. 13, the first image is segmented into M×N tiles in step S140. As a result, M×N rectangular tiles TL(0, 0), TL(1, 0), TL(2, 0), ..., TL(2, 4), and TL(3, 4) are generated. As described above, FIG. 3 shows the first image segmented into M×N rectangles. Referring to FIG. 3, X and Y respectively represent the numbers of horizontal and vertical pixels of the first image 201, and p and q respectively represent the numbers of horizontal and vertical pixels of each tile upon segmenting the first image into M×N rectangular tiles TL(0, 0), TL(1, 0), TL(2, 0), ..., TL(2, 4), and TL(3, 4). Hence, X=p=M and Y=q×N.

Also, as shown in FIG. 4, each tile is composed of p×q three primary color (red (R), green (G), and blue (B)) data.

Subsequently, in step S141, the R, G, and B average luminance values of each of the M×N tiles segmented in step S140 are calculated to obtain feature amounts by:

$$Rd\_av = (1/(p \times q)) \times \Sigma Ri$$

$$Gd\_av = (1/(p \times q)) \times \Sigma Gi$$

$$Bd\_av = (1/(p \times q)) \times \Sigma Bi$$

Note that d is an abbreviation for destination.

In step S142, R, G, and B average luminance values of each of P material images are calculated by equations below. The feature amount calculation method is the same as that used in step S141.

$$Rs\_av = (1/(p \times q)) \times \Sigma Ri$$

$$Gs\_av = (1/(p \times q)) \times \Sigma Gi$$

$$Bs\_av = (1/(p \times q)) \times \Sigma Bi$$

Note that s is an abbreviation for source.

In step S143, the use limit value of each material image is set at K. In step S144, use counts S of all the P material images are reset (initialized) to zero. Note that the use count indicates the number of times each material image 203 is pasted on the first image. At the time of step S144, since none of material images have been selected and pasted, the use counts of all the P material images are zero. Note that the feature amounts of the material images calculated in step S142 and the use counts S are stored in the material image management table shown in FIG. 11.

In step S145, counters X_Pos ($0 \leq$ X_Pos $\leq$ M−1) and Y_Pos ($0 \leq$ Y_Pos $\leq$ N−1) indicating the position of a tile of interest are reset to zero. (X_Pos, Y_Pos)=(0, 0) indicates the upper left tile of the first image. In step S146, a material image suitable for the tile indicated by the position counters X_Pos and Y_Pos is selected from the material images. For example, when X_Pos–Y_Pos=0, the tile position is (0, 0), i.e., indicates the upper left position. Note that material images serving as selection candidates are limited to those having use counts S falling within the range from 0 to K−1.

In the selection method, a distance ΔE of R, G, and B tristimulus values is calculated using the evaluation formula $$\Delta E = (Rs\_av - Rd\_av)^2 + (Gs\_av - Gd\_av)^2 + (Bs\_av - Bd\_av)^2$$

where "^" indicates a power, and "X^2" is the square of and a material image with the smallest ΔE is selected.

In step S147, upon pasting the material image selected by the evaluation formula onto a tile area, it is checked if the material image to be pasted is the same as one of those pasted on eight surrounding tiles, i.e., tiles located at (X_Pos−1, Y_Pos−1), (X_Pos−1, Y_Pos), (X_Pos−1, Y_Pos+1), (X_Pos, Y_Pos−1), (X_Pos, Y_Pos+1), (X_Pos+1, Y_Pos−1), (X_Pos+1, Y_Pos), and (X_Pos+1, Y_Pos+1). If the same material image is found, the use count S of the currently selected image in the material image management table is set at K+S so as to inhibit the selected material image from being used at that tile position, and the flow returns to step S146 to make the same decision (step S148). In the fifth embodiment, the processing progresses from the left to right tiles on a single horizontal line, and upon completion of processing for one horizontal line, the horizontal line to be processed shifts to the lower neighboring line. Therefore, of the eight surrounding tiles, those already pasted with material images are four tiles, i.e., (X_Pos−1, Y_Pos−1), (X_Pos−1, Y_Pos), (X_Pos, Y_Pos−1), and (X_Pos+1, Y_Pos−1).

In this way, after the material image which has no identical image at neighboring positions is selected, the selected image is pasted on the tile area of interest. Upon pasting the selected image on the tile area, if their sizes do not match, the selected image is enlarged/reduced to an appropriate size.

In step S149, the use count S of the pasted material image is incremented by 1. In step S150, K is subtracted from the use counts S of material images whose use count $\geq$ K+1, so as to restore the use counts S of material images, which are inhibited from being used due to the presence of identical images at neighboring positions in steps S147 and S148. In this fashion, a material image which has no identical images at neighboring positions is selected.

The aforementioned processes are continuously done in the horizontal and vertical directions until all tiles are processed (steps S151 and S152). In this manner, corresponding material images are pasted on all the tiles of the first image.

As described above, according to the fifth embodiment, since the number of times of use of each material image is limited to K, and identical material images are inhibited from being located at neighboring positions, a mosaic image with improved image quality can be generated even when the number of material images is small.

Sixth Embodiment

In the fifth embodiment, upon determining a material image to be pasted on a given tile, a material image, which has no identical images at neighboring positions and has feature amounts close to those of the corresponding block of the first image, is selected. At this time, the tile processing order is set to process each horizontal line from the left to right, and select a lower horizontal line upon completion of the processing of a given horizontal line. However, the tile processing order is not limited to such specific order, but may be determined, as will be described below in the sixth embodiment. Note that the arrangement of an image processing apparatus in the sixth embodiment is the same as that in the first embodiment (FIG. 5), and a detailed description thereof will be omitted.

Figure 14:
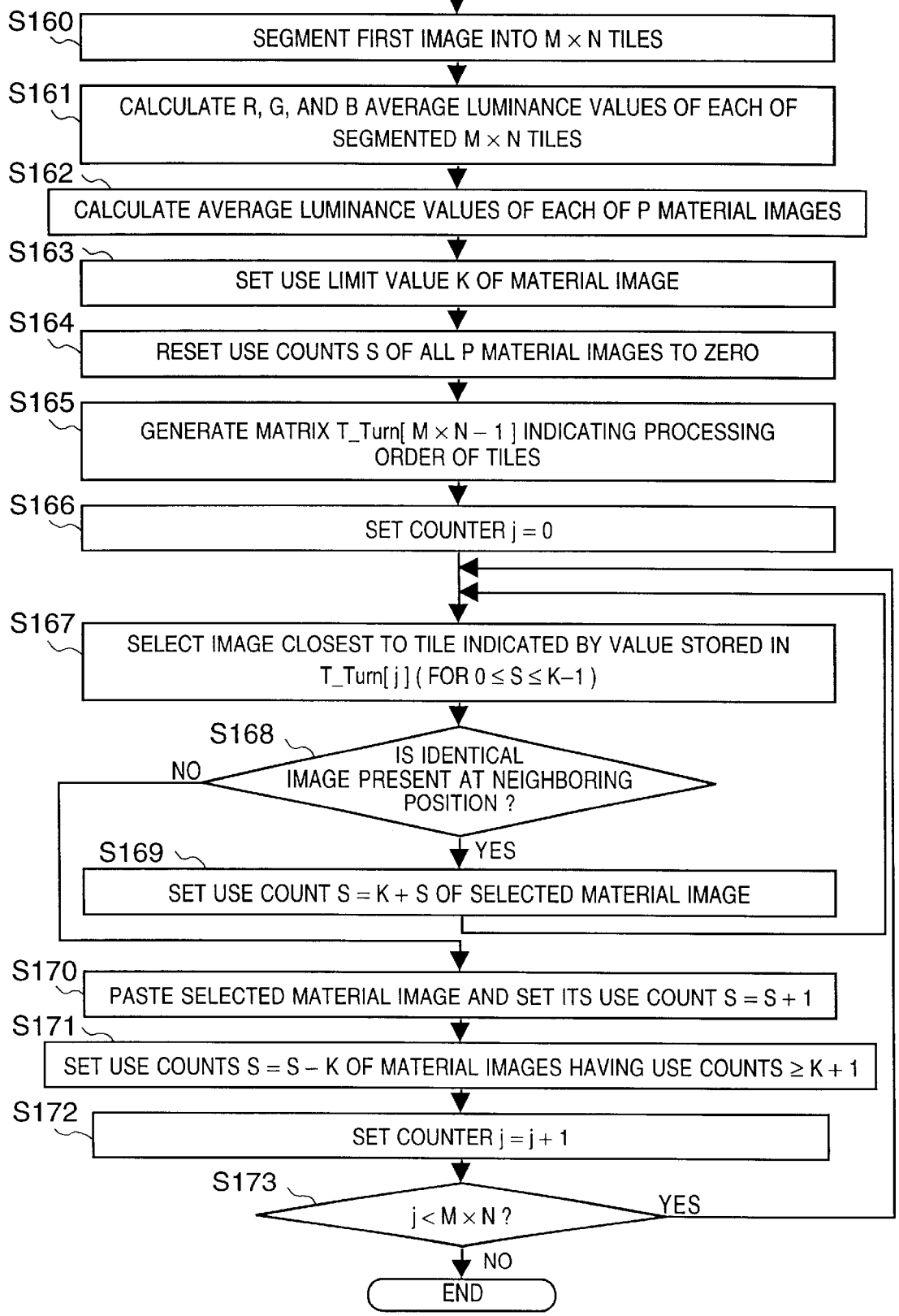
FIG. 14 is a flow chart showing an example of mosaic image generation according to the sixth embodiment of the present invention.

FIG. 14 is a flow chart showing the mosaic image generation method according to the sixth embodiment. In FIG. 14, steps S160 to S164 are the same as steps S140 to S144 in FIG. 13.

In step S145, the processing order of tiles is stored in a matrix T_Turn[M*N−1] that indicates the processing order of tiles. The method for storing the processing order in the matrix T_Turn[M*N−1] is as has been described earlier with reference to the flow chart in FIG. 9.

In step S166, counter j is reset to zero. In step S167, an image having average luminance values closest to those of a tile designated by a value stored in T_Turn[j] is selected from the material images. Note that material images serving as selection candidates are limited to those having use counts S falling within the range from 0 to K−1. In the selection method of the material image, the distance ΔE of R, G, and B tristimulus values is calculated, and an image with the smallest ΔE is selected, as in step S146.

In step S168, upon pasting the image selected in step S167 on a tile area, it is checked if the image to be pasted has already been used on eight surrounding tiles of the tile of interest. More specifically, it is checked if the material image to be pasted is the same as one of those already pasted on tiles located at (X_Pos−1, Y_Pos−1), (X_Pos−1, Y_Pos), (X_Pos−1, Y_Pos+1), (X_Pos, Y_Pos−1), (X_Pos, Y_Pos+1), (X_Pos+1, Y_Pos−1), (X_Pos+1, Y_Pos), and (X_Pos+1, Y_Pos+1). In the sixth embodiment, since tiles are randomly selected, the positions of tiles on which material images have been pasted around a given tile are not uniquely determined.

If the material image selected in step S167 is pasted on one of the eight surrounding tiles, the use count S of that selected image is set at K+S to inhibit use of the material image on that tile in step S169. The flow returns to step S167 to repeat the same processes.

In this way, a material image which is different from those on its surrounding tiles is finally pasted. Upon pasting the selected image to a tile area, if their sizes do not match, the size of the selected image is enlarged/reduced to an appropriate size.

In step S170, the use count S of the pasted material image in the material image management table (FIG. 11) is incremented by 1. In step S171, K is subtracted from the use counts S of material images whose use count $\geq$ K+1, so as to restore the use counts of material images, which are inhibited from being used due to the presence of identical images at neighboring positions in steps S168 and S169.

The aforementioned process repeats itself until j=M×N−1, i.e., all the tiles on the first image are processed (steps S172 and S173).

As described above, according to the sixth embodiment, since the number of times of use of each material image is limited to K to prevent identical material images from being located at neighboring positions, and the selection order of tiles is randomly determined, a mosaic image which is free from texture and has improved image quality can be generated even when the number of material images is small.

Seventh Embodiment

The seventh embodiment will be explained below. In the fifth embodiment, material images are placed so as to use each material image within a use count and not to locate identical material images at neighboring positions. In the sixth embodiment, since the selection order of tiles where material images are pasted is randomly determined, a further reduction of texture is achieved. In both the fifth and sixth embodiments, tiles of an original image are selected one by one, and a material image which is to replace the selected tile is selected and pasted. In the seventh embodiment, when a material image is selected for one tile, tiles having feature amounts close to those of the selected material image are selected, and replacement is done using that material image to its use limit value. The seventh embodiment will be explained below.

Since the arrangement of an image processing apparatus according to the seventh embodiment is the same as that in the first embodiment, a detailed description thereof will be omitted. The mosaic image generation sequence in the image processing apparatus of the seventh embodiment will be explained below with reference to the flow chart in FIG. 15.

Figure 15:
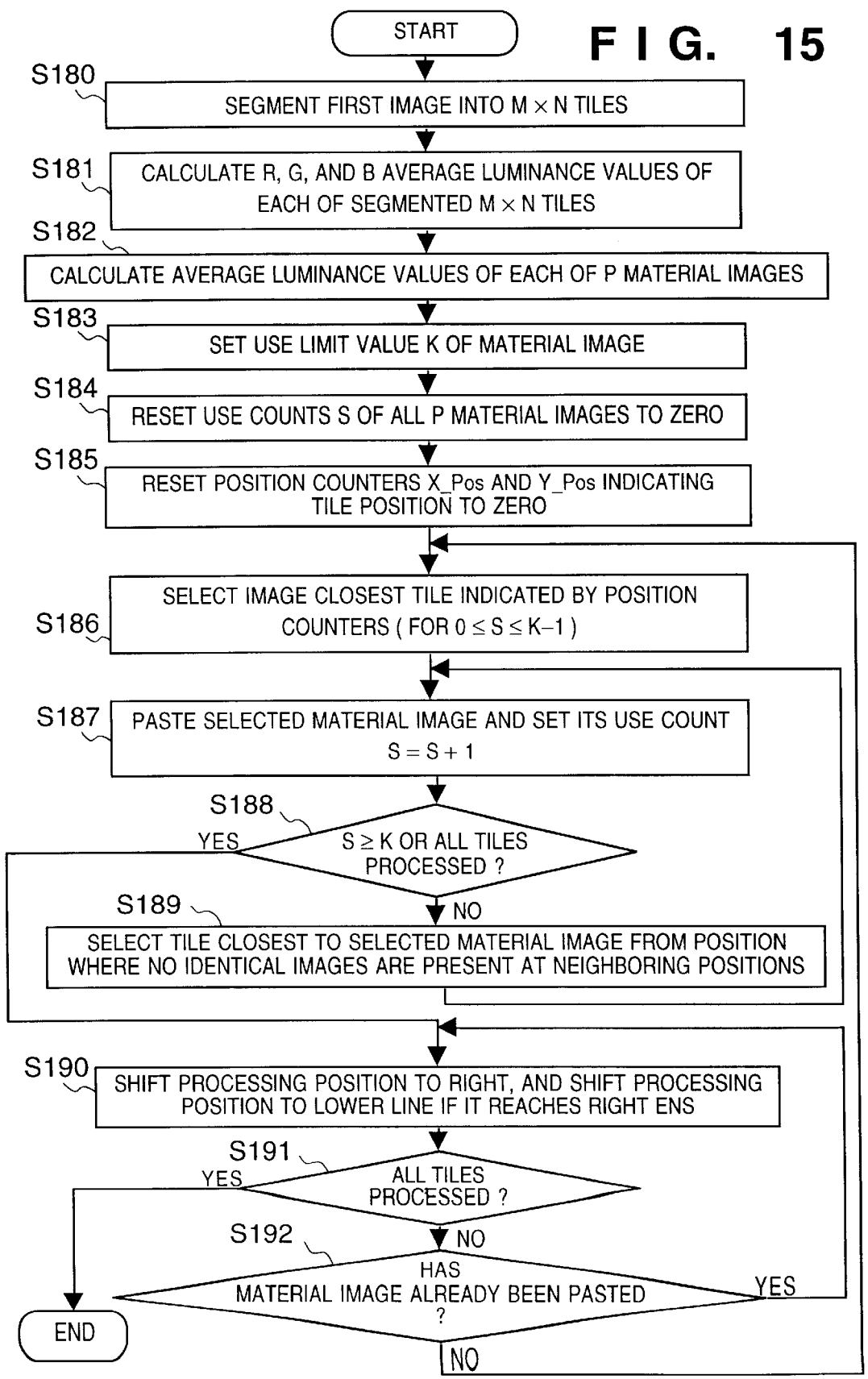
FIG. 15 is a flow chart showing an example of mosaic image generation according to the seventh embodiment of the present invention.

FIG. 15 is a flow chart showing the mosaic image generation method according to the seventh embodiment. In FIG. 15, steps S180 to S186 are the same as steps S140 to S146 in the fifth embodiment, and a detailed description thereof will be omitted.

In step S187, the selected material image is pasted on a tile indicated by position counters, and the use count S of that material image in the material image management table (FIG. 11) is incremented by 1. If the use count S is smaller than an absolute use count K and there are non-processed tiles (step S188), a tile having image characteristics closest to those of the selected material image is selected from tile positions where no identical images are present at neighboring positions (step S189). The flow returns to step S187 to increment the use count S of that material image, and the processing continues until the use count S reaches the absolute use count or processing is complete for all the tiles.

In this way, if the use count S becomes equal to or larger than the absolute use count K, the flow advances to step S190, and the position counters are updated to select the next tile to be processed. It is checked in step S191 based on the values of the position counters if processing is complete for all the tiles. If YES in step S191, this sequence ends. On the other hand, if non-processed tiles remain, the flow advances to step S192 to check if a material image has already been pasted on the tile designated by the updated values of the position counters. If YES in step S192, the flow returns to step S190 to further update the position counters. In this manner, when a non-processed tile is designated by the position counters, the flow returns from step S192 to step S186 to repeat the aforementioned processing.

The above processing is continuously done in the horizontal and vertical directions until all the tiles are processed (steps S190, S191, and S192).

As described above, according to the seventh embodiment, since the absolute use count of each tile is set at K and identical material images are inhibited from being located at neighboring positions, a mosaic image with improved image quality can be generated even when the number of material images is small. Since a maximum of K identical images can be pasted, a mosaic image that allows a Japanese card game called "Sinkei Suijyaku" can be generated.

Eighth Embodiment

In the first to seventh embodiments, a material image is selected in accordance with an evaluation value based on the distance between the segmented original image area and the material image. However, by evaluating only the color distance, the selected material image and original image area may have improper colors.

The eighth embodiment provides an image processing method and apparatus, which allow the user to replace a desired tile area on an automatically generated mosaic image with a material image of his or her choice.

Figure 16:
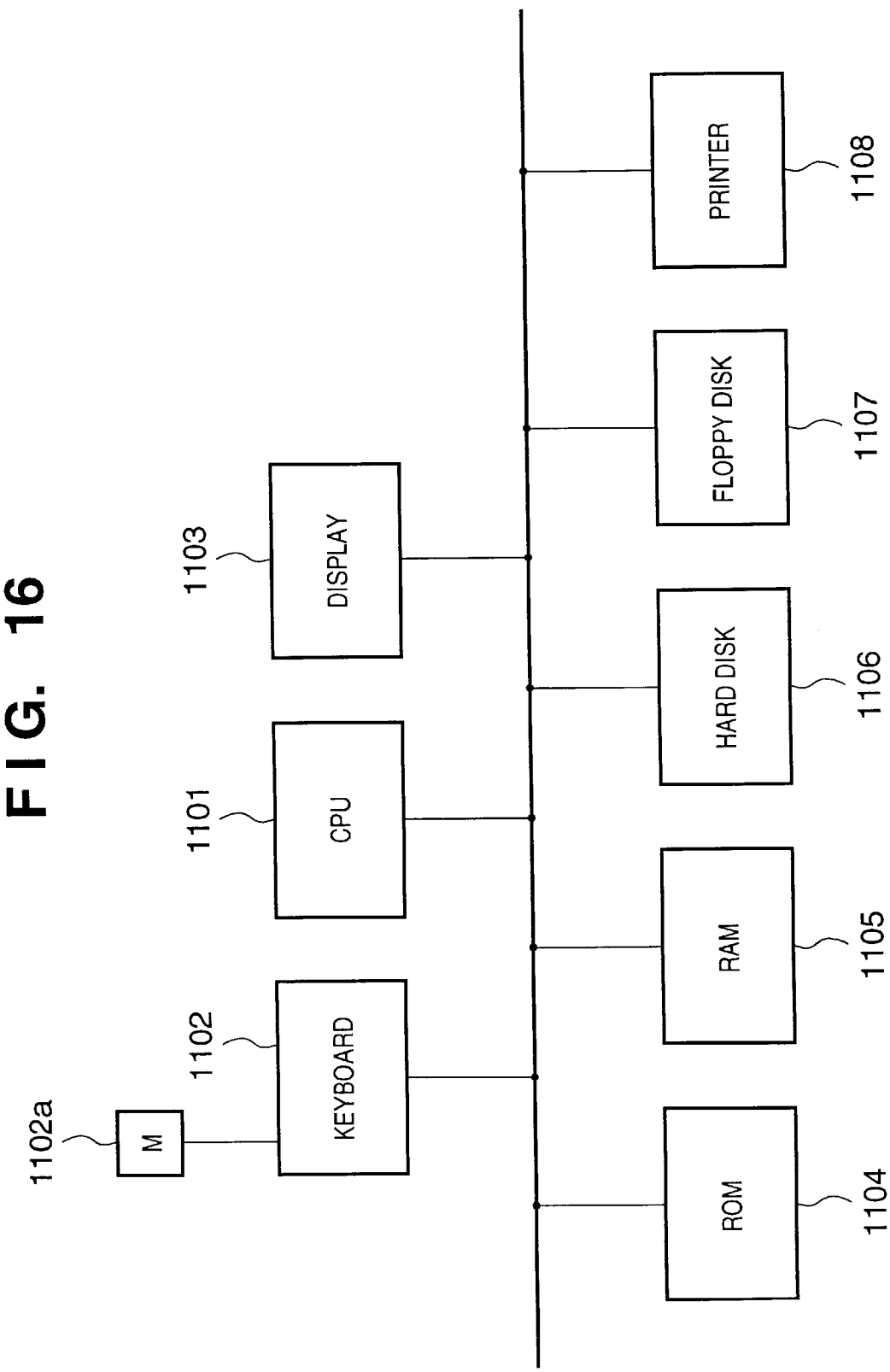
FIG. 16 is a block diagram showing the arrangement of a computer system (image processing apparatus) according to the eighth embodiment of the present invention.

FIG. 16 is a block diagram showing the arrangement of a computer system which implements image processing according to the eighth embodiment of the present invention. Note that the system arrangement shown in FIG. 16 is substantially the same as that shown in FIG. 5.

Referring to FIG. 16, reference numeral 1101 denotes a CPU, which controls the entire system in accordance with a program which is stored in a hard disk 1106 and is loaded onto a RAM 1105. Reference numeral 1102 denotes a keyboard, which is used together with a mouse 1102a to input various commands and data to the system of this embodiment. Reference numeral 1103 denotes a display which comprises, e.g., a CRT, a liquid crystal display, or the like. A ROM 1104 and the RAM 1105 construct a storage unit in the system of this embodiment, and store a program to be executed by the system, data used by the system, and the like. The hard disk 1106 and a floppy disk device 1107 construct an external storage device which is used by a file system of the system of this embodiment. Reference numeral 1108 denotes a printer.

The hard disk 1106 stores a plurality of (P) tile images which serve as building elements of a mosaic image, and a mosaic image is generated by inlaying M×N images selected from those images in an M×N (horizontal×vertical) matrix, as shown in FIG. 17. The generated mosaic image is stored as an image file in the hard disk 1106, and is displayed on the CRT 1103 or is printed out via the printer 1108.

Figure 18:
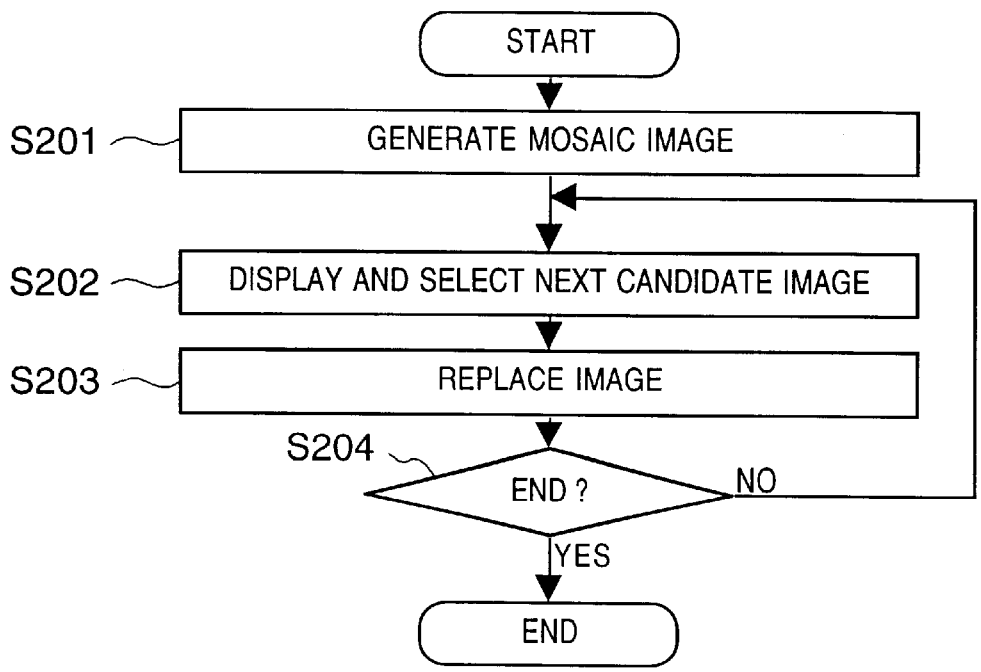
FIG. 18 is a flow chart for explaining the flow of mosaic image generation in the eighth embodiment.

FIG. 18 is a flow chart showing the outline of the processing flow of a mosaic image generation method in the computer system of the eighth embodiment.

In step S201, an original image 201 is segmented into a plurality of areas (tiles), and a material image having a color closest to that of each tile area is selected, thus generating a mosaic image.

This processing may use that described earlier with reference to the flow chart in FIG. 2. Also, the mosaic image generation processing according to each of the first to seventh embodiments described above with reference to FIGS. 6 to 15 may be used.

Since the mosaic image is automatically generated on the basis of the distance (difference) between colors of each tile area of the original image and material image, it is not always a combination of optimal material images when the user observes it.

In this embodiment, as shown in the flow chart in FIG. 18, material images as appropriate "next candidates" are displayed on the screen in correspondence with the mosaic image generated in step S201 and each tile of that mosaic image (step S202) to prompt the user to select an optimal one of the material images and to determine the selected material image as that of the corresponding tile area of the image 201 (step S203), thereby generating a mosaic image having higher quality for the user on the basis of the automatically generated mosaic image.

Figure 19:
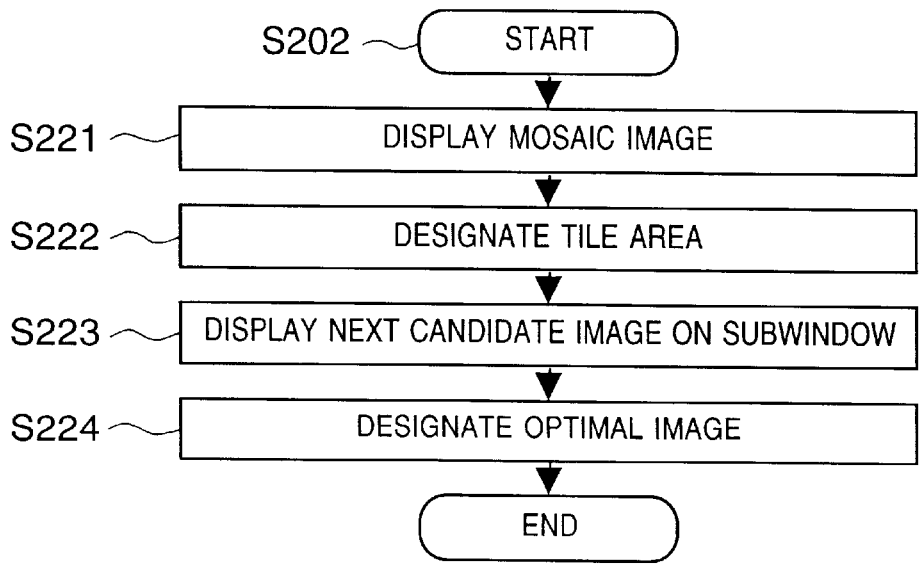
FIG. 19 is a flow chart showing selection of the next candidate of a material image in step S2 in FIG. 18.

FIG. 19 is a flow chart showing material image selection in step S202 in the flow chart shown in FIG. 18.

In step S221, a mosaic image generated in step S201 in FIG. 18 is displayed on the display 1103.

Figure 20:
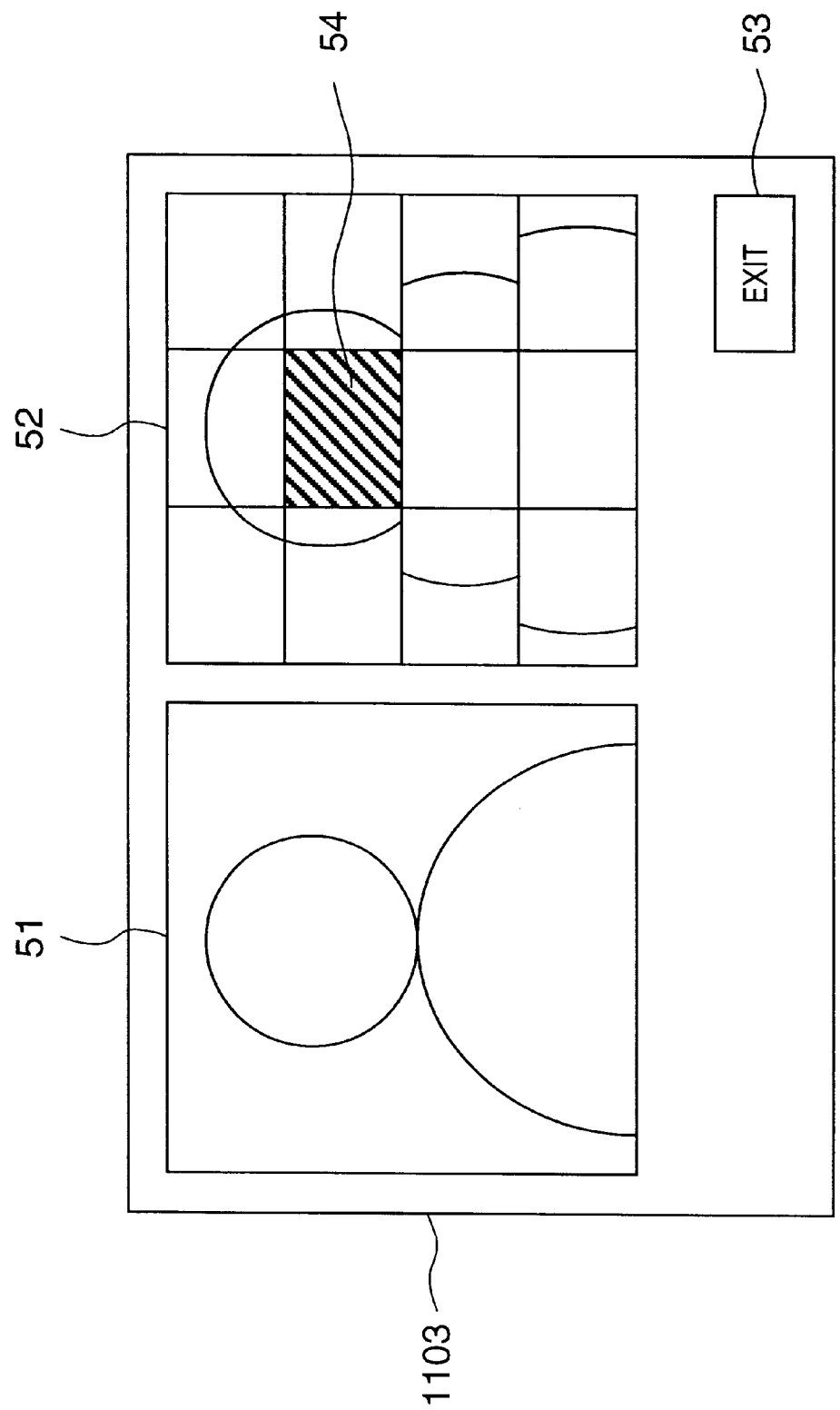

FIG. 20 shows a display example on the display 1103.

Referring to FIG. 20, the original image 201 (denoted by reference numeral 51) is displayed on the left side on the screen, and a mosaic image 52 based on this original image 201 is displayed on the right side of the screen. When the original image 201 and mosaic image are displayed at neighboring positions, the user can edit the image while visually comparing these images. Note that the original image need not always be displayed. For example, when the display area of the screen is not large enough, the image 51 need not be displayed. On the other hand, one of the image 51 and mosaic image 52 may be displayed, and may be selectively displayed by the user using, e.g., the mouse 1102a.

The flow advances to step S222. In step S222, the user moves the mouse cursor to a desired tile position 54 of the mosaic image 52 on the screen of the display 1103, and clicks the button of the mouse 1102a at that position, as shown in FIG. 20. In this manner, the tile 54 is selected, and material image candidates corresponding to that tile are displayed as shown in, e.g., a subwindow 61 in FIG. 21 (step S223).

Referring to FIG. 21, reference numerals 62a to 62d denote material image candidates corresponding to the tile 54. These material image candidates are selected in turn from those in ascending order of the evaluation values calculated in step S201. If no desired material image is included in those displayed on the subwindow 61, the user selects and clicks an icon "Next" 64 using the mouse cursor, thus displaying a subwindow including a next material image candidate group.

If the user finds a desired material image on the displayed subwindow 61, he or she clicks that material image (one of the images 62a to 62d) (step S224), thus displaying the selected material image pasted at the position of the tile 54. In this case as well, if the size of the material image does not match that of the tile 54, the selected material image is enlarged/reduced in correspondence with the size of the tile 54, as described above. In this way, since the replacement result of the tile 54 of the mosaic image 52 by the selected material image 62b is displayed as the mosaic image 52, it is convenient for the user to edit an image while confirming the mosaic image 52 in which a desired tile is replaced by a desired material image. When the material image to be replaced is finally determined, the user clicks an "OK" button 65, thus determining a material image corresponding to the tile 54. After the material image corresponding to the tile 54 is determined, the subwindow 61 disappears from the screen, and the display state on the display 1103 returns to that shown in FIG. 20.

If the user clicks an "Exit" button 53 in FIG. 20, "YES" is determined in step S204 in FIG. 18, thus ending mosaic image generation. On the other hand, if the user clicks another tile in FIG. 20, the flow returns to step S202 to repeat the aforementioned processing.

In this fashion, the processes in steps S202 and S203 in FIG. 18 repeat themselves until the user determines that there are no tiles to be replaced.

In FIG. 21, reference numeral 63 denotes a "Cancel" key for canceling processing; and 53, an "Exit" key for ending material image selection.

Note that material image candidates may be randomly selected from a plurality of material images. Also, as described above, images may be selected in turn. For example, an image with the second smallest distance ΔE (step S201) between the tile and material image may be selected as the next candidate, an image with the third smallest ΔE as still next candidate, and so forth. In this case, selected material images are less likely to differ from the color of the designated tile 54.

Upon canceling this processing, if the mouse 1102a has two, right and left buttons, the processing may be canceled by clicking the subwindow 61 using the right button, in place of using the "Cancel" button 63.

In the example shown in FIG. 21, four material image candidates are displayed on the subwindow. However, the present invention is not limited to this, and more candidates may be simultaneously displayed if the screen has an enough space. If material image candidates are displayed as thumbnail images, more candidates can be displayed while the screen size remains the same.

As described above, according to the eighth embodiment, a mosaic image using optimal material images according to the user's favor can be generated in place of an automatically generated mosaic image.

Material images that form the mosaic image can be replaced by quickly reflecting the operator's will, thus improving the image quality of the mosaic image.

In the eighth embodiment, in FIG. 21, the subwindow 61 is displayed at a lower position near the center of the screen. In place of permanently displaying the subwindow 61 at that position, the display position may be changed every time the subwindow 61 is displayed. For example, when a lower tile of the mosaic image 52 is to be edited, the subwindow 61 displayed at the position shown in FIG. 21 conceals the tile to be edited. In such case, the subwindow 61 is preferably automatically or manually moved to and displayed at an upper position.

When the subwindow 61 is automatically moved and displayed, it is controlled by the CPU 1101 not to conceal the tile of interest.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for forming a mosaic image by combining a plurality of material images, comprising:
   a segmentation step, of segmenting an original image into a plurality of areas;
   a calculation step, of calculating image characteristics including average luminance values, of each of the plurality of areas;
   a determination step, of randomly selecting an area from the plurality of areas and determining a material image corresponding to the selected area on the basis of a number of times of use of each material image and the image characteristics, wherein the determined material image has average luminance values closest to the average luminance values of the selected area; and
   a generation step, of generating a mosaic image by pasting the material image determined in the determination step to the corresponding areas.

2. The method according to claim 1, wherein determination of a correspondence between an area and material image in the determination step selects a material image having image characteristics closest to image characteristics of the area.

3. The method according to claim 1, further comprising the step of calculating image features of the plurality of material images in the same sequence as the calculation step.

4. The method according to claim 1, wherein the image characteristics include an average luminance value of a plurality of pixels that form the area.

5. The method according to claim 1, wherein the image characteristics include average luminance values of a plurality of pixels that form the area in units of color components.

6. The method according to claim 1, wherein the determination step includes the step of determining a material image corresponding to each segmented area on the basis of the image characteristics while allowing a single material image to be pasted in correspondence with the predetermined number of areas, which is not less than 2.

7. The method according to claim 1, wherein the determination step includes the step of determining a material image corresponding to each segmented area on the basis of the image characteristics while inhibiting identical material images from being located at neighboring positions.

8. The method according to claim 1, wherein the determination step comprises:
   the extraction step of extracting an area, to which a material image is not assigned, from the plurality of areas; and
   the selection step of selecting a material image corresponding to the extracted area on the basis of the image characteristics from a group of material images, which are not used on surrounding areas that neighbor the area extracted in the extraction step, of the plurality of material images.

9. The method according to claim 8, wherein the selection step includes the step of selecting a material image corresponding to the extracted area on the basis of the image characteristics from a group of material images, which are not used on surrounding areas that neighbor the area extracted in the extraction step, and have the number of times of use smaller than a predetermined value, of the plurality of material images.

10. The method according to claim 8, wherein the extraction step includes the step of randomly extracting an area from the plurality of areas.

11. The method according to claim 8, further comprising the step of acquiring areas having image characteristics close to the material image selected in the selection step up to a use limit value of the material image, and making the selected material image correspond to the acquired areas.

12. The method according to claim 1, further comprising the step of acquiring areas having image characteristics close to the material image determined in the determination step up to a use limit value of the material image, and making the determined material image correspond to the acquired areas.

13. The method according to claim 1, further comprising:
   the generation step of generating a mosaic image by pasting material images determined in the determination step to the corresponding areas; and
   the material image determination step of determining a material image selected from material image candidates corresponding to each tile area of the mosaic image generated in the generation step as a material image of that tile area.

14. The method according to claim 13, wherein the material image determination step comprises:
   the display step of displaying the mosaic image generated in the generation step;
   the designation step of designating an area of the mosaic image displayed in the display step;
   the candidate display step of displaying material image candidates corresponding to the tile area designated in the designation step; and
   the updating step of updating the displayed mosaic image using a material image selected from the material image candidates displayed in the candidate display step.

15. The method according to claim 14, wherein the updating step includes the step of manually selecting a material image from a plurality of material image candidates displayed in the candidate display step.

16. The method according to claim 14, wherein the material image determination step further comprises the step of canceling an update process in the updating step.

17. The method according to claim 14, wherein the candidate display step includes the step of selecting and displaying candidates on the basis of a predetermined condition.

18. The method according to claim 14, wherein the candidate display step includes the step of selecting and displaying candidates on the basis of differences between the image characteristics of the area and image characteristics of the plurality of material images.

19. The method according to claim 14, wherein the candidate display step includes the step of displaying a plurality of material image candidates within a predetermined window.

20. The method according to claim 19, wherein the predetermined window is displayed at a position where the window does not overlap the area designated in the designation step.

21. An image processing apparatus for forming a mosaic image by combining a plurality of material images, comprising:
  storage means for storing the plurality of material images;
  segmentation means for segmenting an original image into a plurality of areas;
  calculation means for calculating image characteristics including average luminance values, of each of the plurality of areas;
  determination means for randomly selecting an area from the plurality of areas and determining a material image corresponding to the selected area on the basis of a number of times of use of each material image and the image characteristics, wherein the determined material image has average luminance values closest to the average luminance values of the selected area; and
  generation means for generating a mosaic image by pasting the material image determined by said determination means to the corresponding areas.

22. The apparatus according to claim 21, wherein determination of a correspondence between an area and material image by said determination means selects a material image having image characteristics closest to image characteristics of the area.

23. The apparatus according to claim 21, further comprising means for calculating image features of the plurality of material images in the same sequence as said calculation means.

24. The apparatus according to claim 21, wherein the image characteristics include an average luminance value of a plurality of pixels that form the area.

25. The apparatus according to claim 21, wherein the image characteristics include average luminance values of a plurality of pixels that form the area in units of color components.

26. The apparatus according to claim 21, wherein said determination means determines a material image corresponding to each segmented area on the basis of the image characteristics while allowing a single material image to be pasted in correspondence with the predetermined number of areas, which is not less than 2.

27. The apparatus according to claim 21, wherein said determination means determines a material image corresponding to each segmented area on the basis of the image characteristics while inhibiting identical material images from being located at neighboring positions.

28. The apparatus according to claim 21, wherein said determination means comprises:
  extraction means for extracting an area, to which a material image is not assigned, from the plurality of areas; and
  selection means for selecting a material image corresponding to the extracted area on the basis of the image characteristics from a group of material images, which are not used on surrounding areas that neighbor the area extracted by said extraction means, of the plurality of material images.

29. The apparatus according to claim 28, wherein said selection means selects a material image corresponding to the extracted area on the basis of the image characteristics from a group of material images, which are not used on surrounding areas that neighbor the area extracted by said extraction means, and have the number of times of use smaller than a predetermined value, of the plurality of material images.

30. The apparatus according to claim 28, wherein said extraction means randomly extracts an area from the plurality of areas.

31. The apparatus according to claim 28, further comprising means for acquiring areas having image characteristics close to the material image selected by said selection means up to a use limit value of the material image, and makes the selected material image correspond to the acquired areas.

32. The apparatus according to claim 21, further comprising means for acquiring areas having image characteristics close to the material image determined by said determination means up to a use limit value of the material image, and makes the determined material image correspond to the acquired areas.

33. The apparatus according to claim 21, further comprising:
  generation means for generating a mosaic image by pasting material images determined by said determination means to the corresponding areas; and
  material image determination means for determining a material image selected from material image candidates corresponding to each tile area of the mosaic image generated by said generation means as a material image of that tile area.

34. The apparatus according to claim 33, wherein said material image determination means comprises:
  display means for displaying the mosaic image generated by said generation means;
  designation means for designating an area of the mosaic image displayed by said display means;
  candidate display means for displaying material image candidates corresponding to the tile area designated by said designation means; and
  updating means for updating the displayed mosaic image using a material image selected from the material image candidates displayed by said candidate display means.

35. The apparatus according to claim 34, wherein said updating means manually selects a material image from a plurality of material image candidates displayed by said candidate display means.

36. The apparatus according to claim 34, wherein said material image determination means further comprises means for canceling an update process by said updating means.

37. The apparatus according to claim 34, wherein said candidate display means selects and displays candidates on the basis of a predetermined condition.

38. The apparatus according to claim 34, wherein said candidate display means selects and displays candidates on the basis of differences between the image characteristics of the area and image characteristics of the plurality of material images.

39. The apparatus according to claim 34, wherein said candidate display means displays a plurality of material image candidates within a predetermined window.

40. The apparatus according to claim 39, wherein the predetermined window is displayed at a position where the window does not overlap the area designated by said designation means.

41. A storage medium that records a program code of image processing for forming a mosaic image by combining a plurality of material images, said program code comprising:

a code of a segmentation step, of segmenting an original image into a plurality of areas;

a code of a calculation step, of calculating image characteristics, including average luminance values, of each of the plurality of areas;

a code of a determination step, of randomly selecting an area from the plurality of areas and determining a material image corresponding to the selected area on the basis of a number of times of use of each material image and the image characteristics, wherein the determined material has average luminance values closest to the average luminance values of the selected area; and a code of a generation step, of generating a mosaic image by pasting the material image determined in the determination step to the corresponding areas.

* * * * *

UNITED STATES PATENT AND TRADEMARK OFFICE
CERTIFICATE OF CORRECTION

PATENT NO. : 6,665,451 B1  
APPLICATION NO. : 09/322027  
DATED : December 16, 2003  
INVENTOR(S) : Kiyoshi Kusama et al.

Page 1 of 2

It is certified that error appears in the above-identified patent and that said Letters Patent is hereby corrected as shown below:

<u>IN THE DRAWING: SHEET 15</u>:

FIG. 15, "ENS" should read --END--.

<u>COLUMN 5</u>:

Line 40, "$\Delta E=(Rs\_av-Rd\_{av})^2+(Gs\_av-Gd\_av)^2+(Bs\_av-Bd\_av)^2$" should read --$\Delta E=(Rs\_av-Rd\_av)^2+(Gs\_av-Gd\_av)^2+(Bs\_av-Bd\_av)^2$--.

<u>COLUMN 8</u>:

Line 40, "use counts S all" should read --use counts S of all--.

<u>COLUMN 11</u>:

Line 26, "of and" should read --of X and--.

<u>COLUMN 13</u>:

Line 1, "use counts of" should read --use counts S of--.

<u>COLUMN 15</u>:

Line 10, "(step S202)" should read --(step S202),--;  
Line 11, "images" should read --images,--.

<u>COLUMN 16</u>:

Line 21, "still next" should read --still the next--; and  
Line 25, "two, right and left buttons," should read --two (right and left) buttons,--.

UNITED STATES PATENT AND TRADEMARK OFFICE
CERTIFICATE OF CORRECTION

PATENT NO. : 6,665,451 B1
APPLICATION NO. : 09/322027
DATED : December 16, 2003
INVENTOR(S) : Kiyoshi Kusama et al.

It is certified that error appears in the above-identified patent and that said Letters Patent is hereby corrected as shown below:

COLUMN 18:

Line 29, "step" should read --step,--; and
Line 35, "step" should read --step,--.

Signed and Sealed this

Second Day of September, 2008

JON W. DUDAS
*Director of the United States Patent and Trademark Office*